United States Patent
Liu et al.

(10) Patent No.: US 10,411,871 B2
(45) Date of Patent: Sep. 10, 2019

(54) WIRELESS COMMUNICATION METHOD, DEVICE, AND SYSTEM

(71) Applicant: HUAWEI TECHNOLOGIES CO., LTD., Shenzhen (CN)

(72) Inventors: Sheng Liu, Shenzhen (CN); Teyan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 15/440,668

(22) Filed: Feb. 23, 2017

(65) Prior Publication Data

US 2017/0163404 A1 Jun. 8, 2017

Related U.S. Application Data

(63) Continuation of application No. PCT/CN2014/085221, filed on Aug. 26, 2014.

(51) Int. Cl.
*H04L 5/14* (2006.01)
*H04W 72/04* (2009.01)

(52) U.S. Cl.
CPC .............. *H04L 5/14* (2013.01); *H04L 5/1461* (2013.01); *H04L 5/1469* (2013.01);
(Continued)

(58) Field of Classification Search
None
See application file for complete search history.

(56) References Cited

U.S. PATENT DOCUMENTS

2004/0208194 A1* 10/2004 Restivo ............... H04B 7/2612
  370/443
2007/0041347 A1* 2/2007 Beale .................... H04W 48/10
  370/335
(Continued)

FOREIGN PATENT DOCUMENTS

CN 101409929 A 4/2009
CN 103516638 1/2014
(Continued)

OTHER PUBLICATIONS

International Search Report dated Jun. 1, 2015 in corresponding International Application No. PCT/CN2014/085221.
(Continued)

*Primary Examiner* — Ajit Patel
(74) *Attorney, Agent, or Firm* — Staas & Halsey LLP

(57) ABSTRACT

Embodiments of the present invention provide a wireless communication method, device, and system, which relate to the field of communications technologies, and can resolve a problem of low carrier utilization in a wireless communications system. In the method, a wireless access device communicates with user equipment on a first carrier by using at least three timeslots, where the at least three timeslots include at least one full-duplex timeslot, at least one downlink timeslot, and at least one uplink timeslot; the wireless access device performs one or more of signal sending or signal reception in the full-duplex timeslot; the wireless access device sends a downlink signal in the downlink timeslot; and the wireless access device receives an uplink signal in the uplink timeslot. The embodiments of the present invention are used for wireless communication.

18 Claims, 12 Drawing Sheets

(52) U.S. Cl.
CPC ..... *H04W 72/042* (2013.01); *H04W 72/0413* (2013.01); *H04W 72/0446* (2013.01)

(56) References Cited

U.S. PATENT DOCUMENTS

| | | | | |
|---|---|---|---|---|
| 2014/0098720 A1* | 4/2014 | Zeng | ................ | H04W 72/0446 370/280 |
| 2014/0098774 A1* | 4/2014 | Gao | ................ | H04L 5/001 370/329 |
| 2014/0161003 A1* | 6/2014 | Han | ................ | H04W 52/146 370/280 |
| 2014/0169232 A1* | 6/2014 | Aggarwal | ................ | H04L 5/14 370/277 |
| 2015/0103802 A1 | 4/2015 | Cheng et al. | | |
| 2015/0229461 A1* | 8/2015 | DiFazio | ................ | H04L 5/14 370/280 |
| 2015/0305057 A1* | 10/2015 | Eriksson | ................ | H04W 72/1268 370/280 |
| 2015/0365218 A1* | 12/2015 | Yang | ................ | H04L 5/0044 370/329 |
| 2015/0365968 A1* | 12/2015 | Kim | ................ | H04B 7/2656 370/280 |
| 2016/0143007 A1* | 5/2016 | Xu | ................ | H04L 5/0053 370/329 |
| 2016/0149687 A1* | 5/2016 | Lei | ................ | H04W 16/10 370/280 |
| 2016/0242188 A1* | 8/2016 | Tiirola | ................ | H04W 24/10 |

FOREIGN PATENT DOCUMENTS

| | | |
|---|---|---|
| CN | 103781181 | 5/2014 |
| CN | 103906242 | 7/2014 |

OTHER PUBLICATIONS

International Search Report, dated Jun. 1, 2015, in International Application No. PCT/CN2014/085221 (4 pp.).

Chinese Office Action dated Mar. 4, 2019 in Chinese Application No. 201480081345.2.

* cited by examiner

WIRELESS COMMUNICATION METHOD, DEVICE, AND SYSTEM

CROSS-REFERENCE TO RELATED APPLICATIONS

This application is a continuation of International Application No. PCT/CN2014/085221, filed on Aug. 26, 2014, the disclosure of which is hereby incorporated by reference in its entirety.

TECHNICAL FIELD

Embodiments of the present invention relate to the field of communications technologies, and in particular, to a wireless communication method, device, and system.

BACKGROUND

In a wireless communications system such as a cellular mobile communications system, a wireless local area network (WLAN for short), or a fixed wireless access (WLAN for short) system, a communications node such as a base station (BS for short), an access point (AP for short), a relay station (RS for short), or user equipment (UE for short) generally has capabilities of transmitting a signal of the communications node and receiving a signal of another communications node. Because a radio signal is greatly attenuated on a radio channel, compared with a signal transmitted by a transmit end of a communications node, a radio signal from another communications node is already quite weak when arriving at a receive end of the communications node. For example, a power difference between a received signal and a transmitted signal of a communications node in a cellular mobile communications system typically reaches 80 dB~140 dB. Therefore, to avoid interference from a transmitted signal of a communications node to a received signal of the same communications node, different frequency bands or time periods are usually used to distinguish between radio signal sending and reception. In a wireless communications system that uses time division duplex (TDD for short), a same carrier is used as a carrier for a sent signal and a received signal, and signal sending and reception are performed in different timeslots on the carrier to ensure complete separation between reception and sending, thereby avoiding interference from sending to reception. In frequency division duplex (FDD for short), different carriers spaced apart by a specific quantity of guard carriers are used for sending and reception. A normal practice is: sending and reception are performed respectively on two spectrum-paired carriers, and there is a guard band (where the guard band is usually 190 MHz) between the two carriers, to prevent mutual interference between a receiving device and a neighboring sending device.

In the prior art, a radio frame in a TDD system is divided into multiple timeslots in terms of time, and each timeslot is configured for a downlink or configured for an uplink, so that the system can configure a proper uplink-downlink timeslot ratio according to an uplink-downlink service volume ratio. For example, in a TDD cellular mobile communications system, an uplink-downlink service volume ratio is usually 1:3. Therefore, uplink and downlink timeslots are typically configured at a ratio of 1:3. However, because each timeslot in the TDD system is only used to receive or send a signal in a fixed time period, spectrum utilization is still not high. In an FDD mode, because spectrum-paired carriers are usually used in FDD, when a symmetric service (that is, amounts of sent data and received data are equivalent) is supported, uplink and downlink spectrums can be fully used; however, for an asymmetric service (that is, amounts of sent data and received data are greatly different), carrier spectrum utilization is greatly reduced. In conclusion, the prior art has a problem of low carrier spectrum utilization.

SUMMARY

Embodiments of the present invention provide a wireless communication method, device, and system, which can resolve a problem of low spectrum utilization in a wireless communications system.

According to a first aspect, a wireless communication method is provided, where a wireless access device communicates with user equipment on a first carrier by using at least three timeslots, and the at least three timeslots include at least one full-duplex timeslot, at least one downlink timeslot, and at least one uplink timeslot;
and
the method includes:
performing, by the wireless access device, one or more of signal sending or signal reception in the full-duplex timeslot;
sending, by the wireless access device, a downlink signal in the downlink timeslot; and
receiving, by the wireless access device, an uplink signal in the uplink timeslot.

With reference to the first aspect, in a first possible implementation manner, the sending, by the wireless access device, a downlink signal in the downlink timeslot includes:
when a service volume of to-be-transmitted downlink data does not exceed a first downlink service volume threshold, sending, by the wireless access device, the to-be-transmitted downlink data by using the downlink timeslot.

With reference to the first aspect, in a second possible implementation manner, the receiving, by the wireless access device, an uplink signal in the uplink timeslot includes:
when a service volume of to-be-transmitted uplink data does not exceed a first uplink service volume threshold, receiving, by the wireless access device, the to-be-transmitted uplink data by using the uplink timeslot.

With reference to the first aspect, or the first or the second possible implementation manner of the first aspect, in a third possible implementation manner, the performing, by the wireless access device, one or more of signal sending or signal reception in the full-duplex timeslot includes one or more of the following:
when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot, where the first full-duplex timeslot is only used to send a downlink signal; or
when the service volume of the to-be-transmitted uplink data is greater than the first uplink service volume threshold, and the service volume of the to-be-transmitted downlink data is less than a second downlink service volume threshold, receiving, by using at least one second full-duplex timeslot, the to-be-transmitted uplink data sent by the user equipment, where the second full-duplex timeslot is only used to receive an uplink signal.

With reference to any one of the first aspect, or the first to the third possible implementation manners of the first aspect, in a fourth possible implementation manner, the method further includes:

obtaining, by the wireless access device, an estimation of a self-interference channel matrix of the wireless access device by using the downlink signal sent in the downlink timeslot.

With reference to the fourth possible implementation manner of the first aspect, in a fifth possible implementation manner, the downlink timeslot includes L multiplexing symbols in a time domain, and each of the multiplexing symbols includes K transform-domain subunits in a transform domain; and the obtaining, by the wireless access device, an estimation of a self-interference channel matrix of the wireless access device by using the downlink signal sent in the downlink timeslot includes:

obtaining a downlink signal vector $x(k)=[x_0(k), x_1(k), \ldots, x_{M-1}(k)]^T$ of transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtaining, according to the downlink signal vector, a self-interference signal $y_n(k)=x^T(k)h_n$ that is received by the wireless access device on the $n^{th}$ receive antenna, where $n=0, 1, \ldots, N-1$, N is a quantity of receive antennas of the wireless access device, $h_n=[k_{n,0}, h_{n,1}, \ldots, h_{n,M-1}]^T$, and $h_{n,m}$ ($n=0, 1, \ldots, N-1, m=0, 1, \ldots, M-1$) is an element in the $n^{th}$ row and the $m^{th}$ column of the to-be-estimated N×M-dimensional self-interference channel matrix of the wireless access device;

obtaining, according to the self-interference signal on the L multiplexing symbols that is received by the $n^{th}$ receive antenna, linear equations $y_n=X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtaining the estimation of the self-interference channel matrix of the wireless access device according to the linear equations $y_n=X^T h_n$.

With reference to any one of the first aspect, or the first to the fifth possible implementation manners of the first aspect, in a sixth possible implementation manner, the performing, by the wireless access device, one or more of signal sending or signal reception in the full-duplex timeslot includes:

sending, by the wireless access device, a downlink signal to first user equipment on a first channel resource in the full-duplex timeslot; and/or receiving, by the wireless access device on a second channel resource in the full-duplex timeslot, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain.

With reference to any one of the first aspect, or the first to the sixth possible implementation manners of the first aspect, in a seventh possible implementation manner, the performing, by the wireless access device, signal sending in the full-duplex timeslot includes:

sending, by the wireless access device, a first control signal to the user equipment by using at least one first multiplexing symbol in the full-duplex timeslot, where the first control signal includes downlink common control signaling and a downlink common reference symbol, and the first multiplexing symbol is only used to send a signal.

With reference to any one of the first aspect, or the first to the sixth possible implementation manners of the first aspect, in an eighth possible implementation manner, the performing, by the wireless access device, signal reception in the full-duplex timeslot includes:

receiving, by the wireless access device by using at least one second multiplexing symbol in the full-duplex timeslot, a second control signal sent by the user equipment, where the second control signal includes an uplink common reference symbol, and the second multiplexing symbol is only used to receive a signal.

With reference to any one of the first aspect, or the first to the eighth possible implementation manners of the first aspect, in a ninth possible implementation manner, the method further includes:

obtaining, by the wireless access device, a receive power of the uplink signal sent to the user equipment;

obtaining, by the wireless access device, an estimation of an uplink interference and noise floor of full-duplex communication; and when a ratio of the receive power to the estimation of the uplink interference and noise floor of full-duplex communication is less than a second threshold, receiving, by the wireless access device, the uplink signal that is sent by the user equipment in the uplink timeslot.

With reference to any one of the first aspect, or the first to the ninth possible implementation manners of the first aspect, in a tenth possible implementation manner, the receiving, by the wireless access device, an uplink signal in the uplink timeslot specifically includes:

receiving, by the wireless access device in the uplink timeslot, a random access signal sent by the user equipment.

With reference to any one of the first aspect, or the first to the tenth possible implementation manners of the first aspect, in an eleventh possible implementation manner, the method further includes:

sending, by the wireless access device, a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot; and receive, by the wireless access device, a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

With reference to the eleventh possible implementation manner of the first aspect, in a twelfth possible implementation manner, the neighboring user equipment list further includes a path loss between the at least one user equipment served by the wireless access device and the at least one other user equipment served by the wireless access device.

With reference to any one of the first aspect, or the first to the twelfth possible implementation manners of the first aspect, in a thirteenth possible implementation manner, a radio frame used by the wireless access device includes sub-frames #0 to #9, where the downlink timeslot includes a downlink pilot timeslot in the sub-frame #1, and the uplink timeslot includes an uplink pilot timeslot in the sub-frame #1.

With reference to any one of the first aspect, or the first to the twelfth possible implementation manners of the first aspect, in a fourteenth possible implementation manner, a radio frame used by the wireless access device includes sub-frames #0 to #9, where the downlink timeslot includes a downlink pilot timeslot in the sub-frame #6, and the uplink timeslot includes an uplink pilot timeslot in the sub-frame #6.

According to a second aspect, a wireless communication method is provided, where user equipment communicates with a wireless access device on a first carrier by using at least three timeslots, and the at least three timeslots include at least one full-duplex timeslot, at least one downlink timeslot, and at least one uplink timeslot; and the method includes:

performing, by the user equipment, one or more of signal sending or signal reception in the full-duplex timeslot;

receiving, by the user equipment, a downlink signal in the downlink timeslot; and sending, by the user equipment, an uplink signal in the uplink timeslot.

With reference to the second aspect, in a first possible implementation manner, the receiving, by the user equipment, a downlink signal in the downlink timeslot includes:

when a service volume of to-be-transmitted downlink data does not exceed a first downlink service volume threshold, receiving, by the user equipment, the to-be-transmitted downlink data by using the downlink timeslot.

With reference to the second aspect, in a second possible implementation manner, the sending, by the user equipment, an uplink signal in the uplink timeslot includes:

when a service volume of to-be-transmitted uplink data does not exceed a first uplink service volume threshold, sending, by the user equipment, the to-be-transmitted uplink data by using the uplink timeslot.

With reference to the second aspect, or the first or the second possible implementation manner of the second aspect, in a third possible implementation manner, the performing, by the user equipment, one or more of signal sending or signal reception in the full-duplex timeslot includes one or more of the following:

when the service volume of the to-be-transmitted downlink data is greater than the first downlink service volume threshold, and the service volume of the to-be-transmitted uplink data is less than a second uplink service volume threshold, receiving, by using at least one first full-duplex timeslot, the to-be-transmitted downlink data sent by the wireless access device, where the first full-duplex timeslot is only used to receive a downlink signal; or when the service volume of the to-be-transmitted uplink data is greater than the first uplink service volume threshold, and the service volume of the to-be-transmitted downlink data is less than a second downlink service volume threshold, sending, by the user equipment, the to-be-transmitted uplink data to the wireless access device by using at least one second full-duplex timeslot, where the second full-duplex timeslot is only used to send an uplink signal.

With reference to any one of the second aspect, or the first to the third possible implementation manners of the second aspect, in a fourth possible implementation manner, the sending, by the user equipment, an uplink signal in the uplink timeslot specifically includes: sending, by the user equipment, a random access signal in the uplink timeslot.

With reference to any one of the second aspect, or the first to the fourth possible implementation manners of the second aspect, in a fifth possible implementation manner, the method further includes:

obtaining, by the user equipment, an estimation of a self-interference channel matrix of the user equipment by using the uplink signal sent in the uplink timeslot.

With reference to the fifth possible implementation manner of the second aspect, in a sixth possible implementation manner, the uplink timeslot includes at least D multiplexing symbols, and each of the multiplexing symbols includes K transform-domain subunits; and the obtaining, by the user equipment, an estimation of a self-interference channel of the user equipment by using the uplink signal sent in the uplink timeslot includes:

obtaining an uplink signal vector of $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_p(d)$ is a signal transmitted by the $p^{th}$ transmit antenna of the user equipment;

obtaining, according to the uplink signal vector, a self-interference signal $y_q(d)=x^T(d)h_q$ that is received by the user equipment on the $q^{th}$ receive antenna, where $q=0, 1, \ldots, Q-1$, Q is a quantity of receive antennas of the user equipment, $h_q=[h_{q,0}, h_{q,1}, \ldots, h_{q,P-1}]^T$, and $h_{q,p}$ ($q=0, 1, \ldots, Q-1$, $p=0, 1, \ldots, P-1$) is an element in the $q^{th}$ row and the $p^{th}$ column of the to-be-estimated Q×P-dimensional self-interference channel matrix of the user equipment;

obtaining, according to the self-interference signal on the D multiplexing symbols that is received by the CO receive antenna, linear equations $y_q=X^T h_q$ corresponding to the $q^{th}$ receive antenna, where $q=0, 1, \ldots, Q-1$, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtaining the estimation of the self-interference channel of the user equipment according to the linear equations $y_q=X^T h_q$.

With reference to any one of the second aspect, or the first to the sixth possible implementation manners of the second aspect, in a seventh possible implementation manner, the performing, by the user equipment, signal reception in the full-duplex timeslot includes:

receiving, by the user equipment by using at least one first multiplexing symbol in the full-duplex timeslot, a first control signal sent by the wireless access device, where the first control signal includes downlink common control signaling and a downlink common reference symbol, and the first multiplexing symbol is only used to receive a downlink signal.

With reference to any one of the second aspect, or the first to the sixth possible implementation manners of the second aspect, in an eighth possible implementation manner, the performing, by the user equipment, signal sending in the full-duplex timeslot includes:

sending, by the user equipment, a second control signal to the wireless access device by using at least one second multiplexing symbol in the full-duplex timeslot, where the second control signal includes an uplink common reference symbol, and the second multiplexing symbol is only used to send an uplink signal.

With reference to any one of the second aspect, or the first to the eighth possible implementation manners of the second aspect, in a ninth possible implementation manner, the method further includes:

receiving, by the user equipment, a scheduling instruction sent by the wireless access device, where the scheduling instruction includes information about a first channel in the uplink timeslot;

sending, by the user equipment according to the scheduling instruction, a beacon signal on the first channel by using the uplink timeslot;

measuring, by the user equipment, a beacon signal that is sent on the first channel by at least one other user equipment served by the wireless access device, and generating a neighboring user equipment list according to the measured beacon signal, where the neighboring user equipment list includes at least an identifier of the user equipment and an identifier of the at least one other user equipment served by the wireless access device; and reporting the neighboring user equipment list to the wireless access device.

With reference to the ninth possible implementation manner of the second aspect, in a tenth possible implementation manner, the method further includes:

generating, by the user equipment according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

According to a third aspect, a wireless access device is provided, where the wireless access device communicates with user equipment on a first carrier by using at least three timeslots, and the at least three timeslots include at least one full-duplex timeslot, at least one downlink timeslot, and at least one uplink timeslot; and the wireless access device includes:

a full-duplex communications unit, configured to perform one or more of signal sending or signal reception in the full-duplex timeslot;

a downlink communications unit, configured to send a downlink signal in the downlink timeslot; and an uplink communications unit, configured to receive an uplink signal in the uplink timeslot.

With reference to the third aspect, in a first possible implementation manner, the downlink communications unit is specifically configured to: when a service volume of to-be-transmitted downlink data does not exceed a first downlink service volume threshold, send the to-be-transmitted downlink data by using the downlink timeslot.

With reference to the third aspect, in a second possible implementation manner, the downlink communications unit is specifically configured to: when a service volume of to-be-transmitted uplink data does not exceed a first uplink service volume threshold, receive the to-be-transmitted uplink data by using the uplink timeslot.

With reference to the third aspect, or the first or the second possible implementation manner of the third aspect, in a third possible implementation manner, the full-duplex communications unit is specifically configured to perform one or more of the following operations: when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot, where the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot, the to-be-transmitted uplink data sent by the user equipment, where the second full-duplex timeslot is only used to receive an uplink signal.

With reference to any one of the third aspect, or the first to the third possible implementation manners of the third aspect, in a fourth possible implementation manner, the wireless access device further includes: an interference channel estimation unit, configured to obtain an estimation of a self-interference channel matrix of the wireless access device by using the downlink signal sent in the downlink timeslot.

With reference to the fourth possible implementation manner of the third aspect, in a fifth possible implementation manner, the downlink timeslot includes L multiplexing symbols in a time domain, and each of the multiplexing symbols includes K transform-domain subunits in a transform domain; and the interference channel estimation unit is specifically configured to: obtain a downlink signal vector of $x(k)=[x_0(k), x_1(k), \ldots, x_{M-1}(k)]^T$ of transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtain, according to the downlink signal vector, a self-interference signal $y_n(k)=x^T(k)h_n$ that is received by the wireless access device on the $n^{th}$ receive antenna, where $n=0, 1, \ldots, N-1$, N is a quantity of receive antennas of the wireless access device, $h_n=[h_{n,0}, h_{n,1}, \ldots, h_{n,M-1}]^T$, and $h_{n,m}$ ($n=0, 1, \ldots, N-1, m=0, 1, \ldots, M-1$) is an element in the $n^{th}$ row and the $m^{th}$ column of the to-be-estimated N×M-dimensional self-interference channel matrix of the wireless access device;

obtain, according to the self-interference signal on the L multiplexing symbols that is received by the $n^{th}$ receive antenna, linear equations $y_n X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtain the estimation of the self-interference channel matrix of the wireless access device according to the linear equations $y_n=X^T h_n$.

With reference to any one of the third aspect, or the first to the fifth possible implementation manners of the third aspect, in a sixth possible implementation manner, the full-duplex communications unit is specifically configured to perform one or more of the following operations:

sending a downlink signal to first user equipment on a first channel resource in the full-duplex timeslot; and/or receiving, on a second channel resource in the full-duplex timeslot, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain.

With reference to any one of the third aspect, or the first to the sixth possible implementation manners of the third aspect, in a seventh possible implementation manner, the full-duplex communications unit is specifically configured to send a first control signal to the user equipment by using at least one first multiplexing symbol in the full-duplex timeslot, where the first control signal includes downlink common control signaling and a downlink common reference symbol, and the first multiplexing symbol is only used to send a signal.

With reference to any one of the third aspect, or the first to the sixth possible implementation manners of the third aspect, in an eighth possible implementation manner, the full-duplex communications unit is specifically configured to receive, by using at least one second multiplexing symbol in the full-duplex timeslot, a second control signal sent by the user equipment, where the second control signal includes an uplink common reference symbol, and the second multiplexing symbol is only used to receive a signal.

With reference to any one of the third aspect, or the first to the eighth possible implementation manners of the third aspect, in a ninth possible implementation manner, the wireless access device further includes:

a power obtaining unit, configured to obtain a receive power of the uplink signal sent to the user equipment; and an interference and noise estimation unit, configured to obtain an estimation of an uplink interference and noise floor of full-duplex communication, where the uplink communications unit is specifically configured to: when a ratio of the receive power obtained by the power obtaining unit to the estimation, obtained by the interference and noise estimation unit, of the uplink interference and noise floor of full-duplex communication is less than a second threshold, receive the uplink signal that is sent by the user equipment in the uplink timeslot.

With reference to any one of the third aspect, or the first to the ninth possible implementation manners of the third aspect, in a tenth possible implementation manner, the uplink communications unit is specifically configured to receive, in the uplink timeslot, a random access signal sent by the user equipment.

With reference to any one of the third aspect, or the first to the tenth possible implementation manners of the third aspect, in an eleventh possible implementation manner, the wireless access device further includes:

a scheduling instruction sending unit, configured to send a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot; and a reported information receiving unit, configured to receive a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

With reference to the eleventh possible implementation manner of the third aspect, in a twelfth possible implementation manner, the neighboring user equipment list further includes a path loss between the at least one user equipment served by the wireless access device and the at least one other user equipment served by the wireless access device.

With reference to any one of the third aspect, or the first to the twelfth possible implementation manners of the third aspect, in a thirteenth possible implementation manner, a radio frame used by the wireless access device includes sub-frames #0 to #9, where the downlink timeslot includes a downlink pilot timeslot in the sub-frame #1, and the uplink timeslot includes an uplink pilot timeslot in the sub-frame #1.

With reference to any one of the third aspect, or the first to the twelfth possible implementation manners of the third aspect, in a fourteenth possible implementation manner, a radio frame used by the wireless access device includes sub-frames #0 to #9, where the downlink timeslot includes a downlink pilot timeslot in the sub-frame #6, and the uplink timeslot includes an uplink pilot timeslot in the sub-frame #6.

According to a fourth aspect, user equipment is provided, where the user equipment communicates with a wireless access device on a first carrier by using at least three timeslots, and the at least three timeslots include at least one full-duplex timeslot, at least one downlink timeslot, and at least one uplink timeslot; and the user equipment includes:

a full-duplex communications unit, configured to perform one or more of signal sending or signal reception in the full-duplex timeslot;

a downlink communications unit, configured to receive a downlink signal in the downlink timeslot; and an uplink communications unit, configured to send an uplink signal in the uplink timeslot.

With reference to the fourth aspect, in a first possible implementation manner, the downlink communications unit is specifically configured to: when a service volume of to-be-transmitted downlink data does not exceed a first downlink service volume threshold, receive the to-be-transmitted downlink data by using the downlink timeslot.

With reference to the fourth aspect, in a second possible implementation manner, the uplink communications unit is specifically configured to: when a service volume of to-be-transmitted uplink data does not exceed a first uplink service volume threshold, send the to-be-transmitted uplink data by using the uplink timeslot.

With reference to the fourth aspect, or the first or the second possible implementation manner of the fourth aspect, in a third possible implementation manner, the full-duplex communications unit is specifically configured to perform one or more of the following operations:

when the service volume of the to-be-transmitted downlink data is greater than the first downlink service volume threshold, and the service volume of the to-be-transmitted uplink data is less than a second uplink service volume threshold, receiving, by using at least one first full-duplex timeslot, the to-be-transmitted downlink data sent by the wireless access device, where the first full-duplex timeslot is only used to receive a downlink signal; or when the service volume of the to-be-transmitted uplink data is greater than the first uplink service volume threshold, and the service volume of the to-be-transmitted downlink data is less than a second downlink service volume threshold, sending the to-be-transmitted uplink data to the wireless access device by using at least one second full-duplex timeslot, where the second full-duplex timeslot is only used to send an uplink signal.

With reference to any one of the fourth aspect, or the first to the third possible implementation manners of the fourth aspect, in a fourth possible implementation manner, the uplink communications unit is specifically configured to send a random access signal in the uplink timeslot.

With reference to any one of the fourth aspect, or the first to the fourth possible implementation manners of the fourth aspect, in a fifth possible implementation manner, the user equipment further includes:

an interference channel estimation unit, configured to obtain an estimation of a self-interference channel matrix of the user equipment by using the uplink signal sent in the uplink timeslot.

With reference to the fifth possible implementation manner of the fourth aspect, in a sixth possible implementation manner, the uplink timeslot includes at least D multiplexing symbols, and each of the multiplexing symbols includes K transform-domain subunits; and the interference channel estimation unit is specifically configured to: obtain an uplink signal vector of $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_p(d)$ is a signal transmitted by the $p^{th}$ transmit antenna of the user equipment;

obtain, according to the uplink signal vector, a self-interference signal $y_q(d)=x^T(d)h_q$ that is received by the user equipment on the $q^{th}$ receive antenna, where q=0, 1, ..., Q−1, Q is a quantity of receive antennas of the user equipment, $h_q=[h_{q,0}, h_{q,1}, \ldots, h_{q,P-1}]^T$, and $h_{q,P}$ (q=0, 1, ..., Q−1, p=0, 1, ..., P−1) is an element in the $q^{th}$ row and the $p^{th}$ column of the to-be-estimated Q×P-dimensional self-interference channel matrix of the user equipment;

obtain, according to the self-interference signal on the D multiplexing symbols that is received by the $q^{th}$ receive antenna, linear equations $y_q=X^Th_q$ corresponding to the $q^{th}$ receive antenna, where q=0, 1, ..., Q−1, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtain the estimation of the self-interference channel of the user equipment according to the linear equations $y_q=X^Th_q$.

With reference to any one of the fourth aspect, or the first to the sixth possible implementation manners of the fourth aspect, in a seventh possible implementation manner, the full-duplex communications unit is specifically configured to receive, by using at least one first multiplexing symbol in the full-duplex timeslot, a first control signal sent by the wireless access device, where the first control signal includes downlink common control signaling and a downlink common reference symbol, and the first multiplexing symbol is only used to receive a downlink signal.

With reference to any one of the fourth aspect, or the first to the sixth possible implementation manners of the fourth aspect, in an eighth possible implementation manner, the full-duplex communications unit is specifically configured to send a second control signal to the wireless access device by using at least one second multiplexing symbol in the full-duplex timeslot, where the second control signal includes an uplink common reference symbol, and the second multiplexing symbol is only used to send an uplink signal.

With reference to any one of the fourth aspect, or the first to the eighth possible implementation manners of the fourth aspect, in a ninth possible implementation manner, the user equipment further includes:

a scheduling instruction receiving unit, configured to receive a scheduling instruction sent by the wireless access device, where the scheduling instruction includes information about a first channel in the uplink timeslot, where the uplink communications unit is further specifically configured to send, according to the scheduling instruction received by the scheduling instruction receiving unit, a beacon signal on the first channel by using the uplink timeslot;

a detection unit, configured to: measure a beacon signal that is sent on the first channel by at least one other user equipment served by the wireless access device, and generate a neighboring user equipment list according to the measured beacon signal, where the neighboring user equipment list includes at least an identifier of the user equipment and an identifier of the at least one other user equipment served by the wireless access device; and a reported information sending unit, configured to report the neighboring user equipment list obtained by the detection unit to the wireless access device.

With reference to the ninth possible implementation manner of the fourth aspect, in a tenth possible implementation manner, the detection unit is configured to generate, according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

According to a fifth aspect, a wireless access device is provided, where the wireless access device communicates with user equipment on a first carrier by using at least three timeslots, and the at least three timeslots include at least one full-duplex timeslot, at least one downlink timeslot, and at least one uplink timeslot; and the wireless access device includes: a receiver, a transmitter, a memory, a processor, and a bus, where the receiver, the transmitter, the memory, and the processor are connected by using the bus, to implement mutual communication, and the memory is configured to store data processed by the processor, where the processor is configured to perform one or more of the following operations in the full-duplex timeslot, including: performing signal sending by using the transmitter or performing signal reception by using the receiver;

the processor is configured to send a downlink signal in the downlink timeslot by using the transmitter; and the processor is configured to receive an uplink signal in the uplink timeslot by using the receiver.

With reference to the fifth aspect, in a first possible implementation manner, the processor is specifically configured to: when a service volume of to-be-transmitted downlink data does not exceed a first downlink service volume threshold, send the to-be-transmitted downlink data by using the downlink timeslot and by using the transmitter.

With reference to the fifth aspect, in a second possible implementation manner, the processor is specifically configured to: when a service volume of to-be-transmitted uplink data does not exceed a first uplink service volume threshold, receive the to-be-transmitted uplink data by using the uplink timeslot and by using the receiver.

With reference to any one of the fifth aspect, or the first or the second possible implementation manner of the fifth aspect, in a third possible implementation manner, the processor is specifically configured to perform one or more of the following operations:

when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot and by using the transmitter, where the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot and by using the receiver, the to-be-transmitted uplink data sent by the user equipment, where the second full-duplex timeslot is only used to receive an uplink signal.

With reference to any one of the fifth aspect, or the first to the third possible implementation manners of the fifth aspect, in a fourth possible implementation manner, the processor is further configured to obtain an estimation of a self-interference channel matrix of the wireless access device by using the downlink signal sent in the downlink timeslot.

With reference to the fourth possible implementation manner of the fifth aspect, in a fifth possible implementation manner, the downlink timeslot includes L multiplexing symbols in a time domain, and each of the multiplexing symbols includes K transform-domain subunits in a transform domain; and the processor is specifically configured to: obtain a downlink signal vector $x(k)=[x_0(k), x_1(k), \ldots, x_{M-1}(k)]^T$ of transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtain, according to the downlink signal vector, a self-interference signal $y_n(k)=x^T(k)h_n$ that is received by the wireless access device on the $n^{th}$ receive antenna, where $n=0, 1, \ldots, N-1$, N is a quantity of receive antennas of the wireless access device, $h_n=[h_{n,0}, h_{n,1}, \ldots, h_{n,M-1}]^T$, and $h_{n,m}$ ($n=0, 1, \ldots, N-1, m=0, 1, \ldots, M-1$) is an element in the $n^{th}$ row and the $m^{th}$ column of the to-be-estimated N×M-dimensional self-interference channel matrix of the wireless access device;

obtain, according to the self-interference signal on the L multiplexing symbols that is received by the $n^{th}$ receive antenna, linear equations $y_n=X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtain the estimation of the self-interference channel matrix of the wireless access device according to the linear equations $y_n=X^T h_n$.

With reference to any one of the fifth aspect, or the first to the fifth possible implementation manners of the fifth aspect, in a sixth possible implementation manner, the processor is specifically configured to perform one or more of the following operations:

sending a downlink signal to first user equipment on a first channel resource in the full-duplex timeslot by using the transmitter; or receiving, on a second channel resource in the full-duplex timeslot by using the receiver, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain.

With reference to any one of the fifth aspect, or the first to the sixth possible implementation manners of the fifth aspect, in a seventh possible implementation manner, the processor is specifically configured to send a first control signal to the user equipment by using at least one first multiplexing symbol in the full-duplex timeslot and by using the transmitter, where the first control signal includes downlink common control signaling and a downlink common reference symbol, and the first multiplexing symbol is only used to send a signal.

With reference to any one of the fifth aspect, or the first to the sixth possible implementation manners of the fifth aspect, in an eighth possible implementation manner, the processor is specifically configured to receive, by using at least one second multiplexing symbol in the full-duplex timeslot and by using the receiver, a second control signal sent by the user equipment, where the second control signal includes an uplink common reference symbol, and the second multiplexing symbol is only used to receive a signal.

With reference to any one of the fifth aspect, or the first to the eighth possible implementation manners of the fifth aspect, in a ninth possible implementation manner, the processor is further configured to obtain a receive power of the uplink signal sent to the user equipment;

the processor is further configured to obtain an estimation of an uplink interference and noise floor of full-duplex communication; and the processor is further configured to: when a ratio of the receive power to the estimation of the uplink interference and noise floor of full-duplex communication is less than a second threshold, receive, by using the receiver, the uplink signal that is sent by the user equipment in the uplink timeslot.

With reference to any one of the fifth aspect, or the first to the ninth possible implementation manners of the fifth aspect, in a tenth possible implementation manner, the processor is specifically configured to receive, in the uplink timeslot by using the receiver, a random access signal sent by the user equipment.

With reference to any one of the fifth aspect, or the first to the tenth possible implementation manners of the fifth aspect, in an eleventh possible implementation manner, the processor is configured to send, by using the transmitter, a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot; and the processor is further configured to receive, by using the receiver, a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

With reference to the eleventh possible implementation manner of the fifth aspect, in a twelfth possible implementation manner, the neighboring user equipment list further includes a path loss between the at least one user equipment served by the wireless access device and the at least one other user equipment served by the wireless access device.

With reference to any one of the fifth aspect, or the first to the twelfth possible implementation manners of the fifth aspect, in a thirteenth possible implementation manner, a radio frame used by the wireless access device includes sub-frames #0 to #9, where the downlink timeslot includes a downlink pilot timeslot in the sub-frame #1, and the uplink timeslot includes an uplink pilot timeslot in the sub-frame #1.

With reference to any one of the fifth aspect, or the first to the twelfth possible implementation manners of the fifth aspect, in a fourteenth possible implementation manner, a radio frame used by the wireless access device includes sub-frames #0 to #9, where the downlink timeslot includes a downlink pilot timeslot in the sub-frame #6, and the uplink timeslot includes an uplink pilot timeslot in the sub-frame #6.

According to a sixth aspect, user equipment is provided, where the user equipment communicates with a wireless access device on a first carrier by using at least three timeslots, and the at least three timeslots include at least one full-duplex timeslot, at least one downlink timeslot, and at least one uplink timeslot; and the user equipment includes: a receiver, a transmitter, a memory, a processor, and a bus, where the receiver, the transmitter, the memory, and the processor are connected by using the bus, to implement mutual communication, and the memory is configured to store data processed by the processor, where the processor is configured to perform one or more of the following operations in the full-duplex timeslot, including: performing signal sending by using the transmitter or performing signal reception by using the receiver;

the processor is configured to receive a downlink signal in the downlink timeslot by using the receiver; and the processor is configured to send an uplink signal in the uplink timeslot by using the transmitter.

With reference to the sixth aspect, in a first possible implementation manner, the processor is specifically configured to: when a service volume of to-be-transmitted downlink data does not exceed a first downlink service volume threshold, receive the to-be-transmitted downlink data by using the downlink timeslot and by using the receiver.

With reference to the sixth aspect, in a second possible implementation manner, the processor is specifically configured to: when a service volume of to-be-transmitted uplink data does not exceed a first uplink service volume threshold, send the to-be-transmitted uplink data by using the uplink timeslot and by using the transmitter.

With reference to the sixth aspect, or the first or the second possible implementation manner of the sixth aspect, in a third possible implementation manner, the processor is specifically configured to perform one or more of the following operations:

when the service volume of the to-be-transmitted downlink data is greater than the first downlink service volume threshold, and the service volume of the to-be-transmitted uplink data is less than a second uplink service volume threshold, receiving, by using at least one first full-duplex timeslot and by using the receiver, the to-be-transmitted downlink data sent by the wireless access device, where the first full-duplex timeslot is only used to receive a downlink signal; or when the service volume of the to-be-transmitted uplink data is greater than the first uplink service volume threshold, and the service volume of the to-be-transmitted downlink data is less than a second downlink service volume threshold, sending the to-be-transmitted uplink data to the wireless access device by using at least one second full-duplex timeslot and by using the transmitter, where the second full-duplex timeslot is only used to send an uplink signal.

With reference to any one of the sixth aspect, or the first to the third possible implementation manners of the sixth aspect, in a fourth possible implementation manner, the processor is specifically configured to send a random access signal in the uplink timeslot by using the transmitter.

With reference to any one of the sixth aspect, or the first to the fourth possible implementation manners of the sixth aspect, in a fifth possible implementation manner, the processor is further configured to obtain an estimation of a self-interference channel matrix of the user equipment by using the uplink signal sent in the uplink timeslot.

With reference to the fifth possible implementation manner of the sixth aspect, in a sixth possible implementation manner, the uplink timeslot includes at least D multiplexing symbols, and each of the multiplexing symbols includes K transform-domain subunits; and the processor is specifically configured to: obtain an uplink signal vector $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_P(d)$ is a signal transmitted by the $p^{th}$ transmit antenna of the user equipment;

obtain, according to the uplink signal vector, a self-interference signal $y_q(d)=x^T(d)h_q$ that is received by the user equipment on the $q^{th}$ receive antenna, where $q=0, 1, \ldots, Q-1$, Q is a quantity of receive antennas of the user equipment, $h_q=[h_{q,0}, h_{q,1}, \ldots, h_{q,P-1}]^T$, and $h_{q,P}$ ($q=0, 1, \ldots, Q-1$, $p=0, 1, \ldots, P-1$) is an element in the $q^{th}$ row and the $p^{th}$ column of the to-be-estimated Q×P-dimensional self-interference channel matrix of the user equipment;

obtain, according to the self-interference signal on the D multiplexing symbols that is received by the $q^{th}$ receive antenna, linear equations $y_q=X^T h_q$ corresponding to the $q^{th}$ receive antenna, where $q=0, 1, \ldots, Q-1$, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtain the estimation of the self-interference channel of the user equipment according to the linear equations $y_q=X^T h_q$.

With reference to any one of the sixth aspect, or the first to the sixth possible implementation manners of the sixth aspect, in a seventh possible implementation manner, the processor is specifically configured to receive, by using at least one first multiplexing symbol in the full-duplex timeslot and by using the receiver, a first control signal sent by the wireless access device, where the first control signal includes downlink common control signaling and a downlink common reference symbol, and the first multiplexing symbol is only used to receive a downlink signal.

With reference to any one of the sixth aspect, or the first to the sixth possible implementation manners of the sixth aspect, in an eighth possible implementation manner, the processor is specifically configured to send a second control signal to the wireless access device by using at least one second multiplexing symbol in the full-duplex timeslot and by using the transmitter, where the second control signal includes an uplink common reference symbol, and the second multiplexing symbol is only used to send an uplink signal.

With reference to any one of the sixth aspect, or the first to the eighth possible implementation manners of the sixth aspect, in a ninth possible implementation manner, the processor is further configured to receive, by using the receiver, a scheduling instruction sent by the wireless access device, where the scheduling instruction includes information about a first channel in the uplink timeslot;

the processor is further specifically configured to send, according to the scheduling instruction received by the receiver, a beacon signal on the first channel by using the uplink timeslot and by using the transmitter;

the processor is further configured to: measure a beacon signal that is sent on the first channel by at least one other user equipment served by the wireless access device, and generate a neighboring user equipment list according to the measured beacon signal, where the neighboring user equipment list includes at least an identifier of the user equipment and an identifier of the at least one other user equipment served by the wireless access device; and the processor is further configured to report the obtained neighboring user equipment list to the wireless access device by using the transmitter.

With reference to the ninth possible implementation manner of the sixth aspect, in a tenth possible implementation manner, the processor is further configured to generate, according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

According to a seventh aspect, a wireless communications system is provided, including: an access device and user equipment, where the access device is the access device described in the foregoing third aspect or any possible implementation manner of the third aspect; and the user equipment is the user equipment described in the foregoing fourth aspect or any possible implementation manner of the fourth aspect; or the access device is the access device described in the foregoing fifth aspect or any possible implementation manner of the fifth aspect; and the user equipment is the user equipment described in the foregoing sixth aspect or any possible implementation manner of the sixth aspect.

According to the wireless communication method, device, and system provided in the embodiments of the present invention, downlink signal sending, or uplink signal reception, or simultaneous downlink signal sending and uplink signal reception can be flexibly performed in a full-duplex timeslot on at least one carrier; and signal sending and reception are performed respectively by using a downlink timeslot and an uplink timeslot. Compared with a prior-art TDD mode in which an uplink time period is only used to transmit an uplink signal and a downlink time period is only used to transmit a downlink signal, and a prior-art FDD mode in which an uplink carrier can be only used to transmit an uplink signal and a downlink carrier is only used to transmit a downlink signal, the present invention can improve spectrum utilization in a wireless communications system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
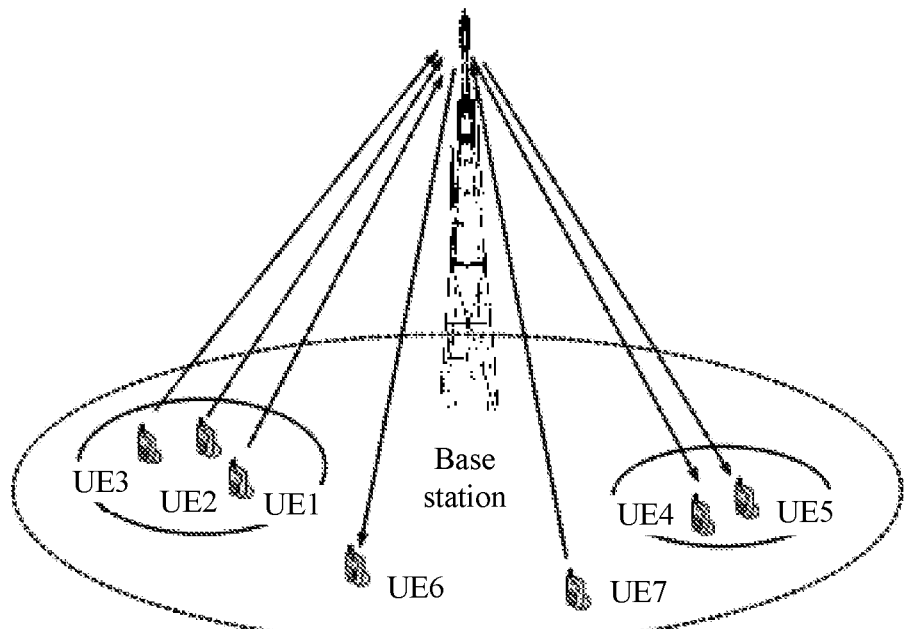
FIG. 1 is a schematic structural diagram of a wireless communications system according to an embodiment of the present invention.

Multiple embodiments are described with reference to the accompanying drawings, and same components in this specification are indicated by a same reference numeral. In the following description, for ease of explanation, many specific details are provided to facilitate comprehensive understanding of one or more embodiments. However, apparently, the embodiments may not be implemented by using these specific details. In other examples, well-known structures and devices are shown in a form of block diagrams, to conveniently describe one or more embodiments.

User equipment (UE for short) provided in the embodiments of the present invention may be a cellular phone, a cordless phone, a Session Initiation Protocol (SIP for short) phone, a wireless local loop (WLL for short) station, a personal digital assistant (PDA for short), a handheld device having a wireless communication function, an in-vehicle device, a wearable device, a computing device, or another processing device connected to a wireless modem.

A wireless access device provided in the embodiments of the present invention may be configured to communicate with the user equipment, so that the user equipment accesses a network system. The wireless access device in the embodiments of the present invention may be specifically a wireless access point (AP for short) of Wireless Fidelity (WiFi for short), a base transceiver station (BTS for short) in the Global System for Mobile Communications (GSM for short) or a Code Division Multiple Access (CDMA for short) system, a NodeB (NB for short) in a Wideband Code Division Multiple Access (WCDMA for short) system, an evolved NodeB (eNB or eNodeB for short) in Long Term Evolution (LTE for short), a relay station or an access point, a base station device on a future 5G network, or the like.

It should be noted that, in the embodiments of the present invention, an "uplink" may refer to a signal transmission direction in which the wireless access device receives a signal and a signal transmission direction in which the user equipment sends a signal; and a "downlink" may refer to a signal transmission direction in which the wireless access device sends a signal and a signal transmission direction in which the user equipment receives a signal. Certainly, all other variations or replacements on this basis shall fall within the protection scope of the present invention. In addition, on an air interface of a wireless cellular system, radio signals are usually divided in terms of time according to a time period of a specific length, that is, are divided according to a radio frame (One radio frame is divided into multiple timeslots, or one radio frame is divided into multiple sub-frames, and one sub-frame is further divided into multiple timeslots. For example, in an LTE-TDD system, one radio frame with a length of 10 ms includes ten sub-frames with a length of 1 ms, and each sub-frame is further divided into two timeslots. In the embodiments of the present invention, one full-duplex timeslot corresponds to one sub-frame or timeslot in one radio frame, and when one radio frame includes multiple full-duplex timeslots, the multiple full-duplex timeslots correspond to many consecutive or inconsecutive sub-frames or timeslots in the radio frame. In a same way, an uplink timeslot and a downlink timeslot in the implementation of the present invention have similar cases.

In addition, the term "A and/or B" in this specification represents three selections: A; B; or A and B. That is, "and/or" may represent an "and" relationship or represent an "or" relationship.

The embodiments of the present invention are applied to a wireless communications system shown in FIG. 1, where the wireless communications system includes a wireless access device and at least one user equipment (UE1 to UE7). In an example in FIG. 1, the wireless access device is a base station, and the base station can perform information exchange with the user equipment.

Figure 2:
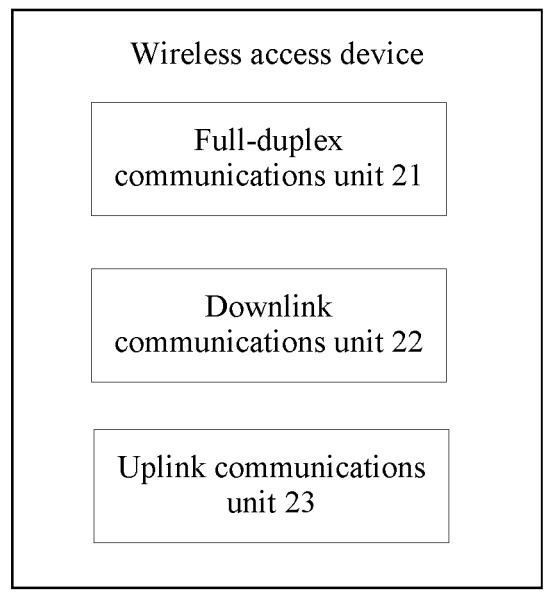
FIG. 2 is a schematic structural diagram of a wireless access device according to an embodiment of the present invention.

Specifically, an embodiment of the present invention provides a wireless access device. The wireless access device communicates with user equipment on a first carrier by using at least three timeslots, and the at least three timeslots include at least one full-duplex timeslot, at least one downlink timeslot, and at least one uplink timeslot. As shown in FIG. 2, the wireless access device includes:

a full-duplex communications unit 21, configured to perform one or more of signal sending or signal reception in the full-duplex timeslot;

a downlink communications unit 22, configured to send a downlink signal in the downlink timeslot; and an uplink communications unit 23, configured to receive an uplink signal in the uplink timeslot.

Figure 3:
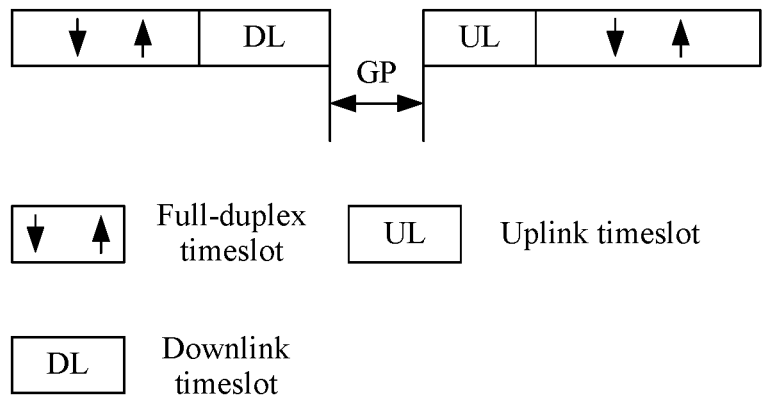
FIG. 3 is a schematic structural diagram of a carrier according to an embodiment of the present invention.

As shown in FIG. 3, the first carrier provided in this embodiment of the present invention successively includes a full-duplex timeslot used for a downlink/uplink (DL/UL for short), a downlink timeslot used for the DL, and an uplink timeslot used for the UL. FIG. 3 further shows a guard period (GP for short) that is set between the downlink timeslot and the uplink timeslot. In this period, a base station neither transmits a signal nor receives a signal. A function of the guard period is to avoid interference caused when a signal transmitted by a base station of a neighboring cell in a downlink timeslot has a relatively long propagation delay and is received by a base station of a cell in an uplink timeslot of this cell. Certainly, the guard period GP may not be set between the downlink timeslot and the uplink timeslot. It may be understood that the guard period shown in FIG. 3 is not a limitation on the present invention, and another implementation manner shall also fall within the protection scope of the present invention.

Figure 4:
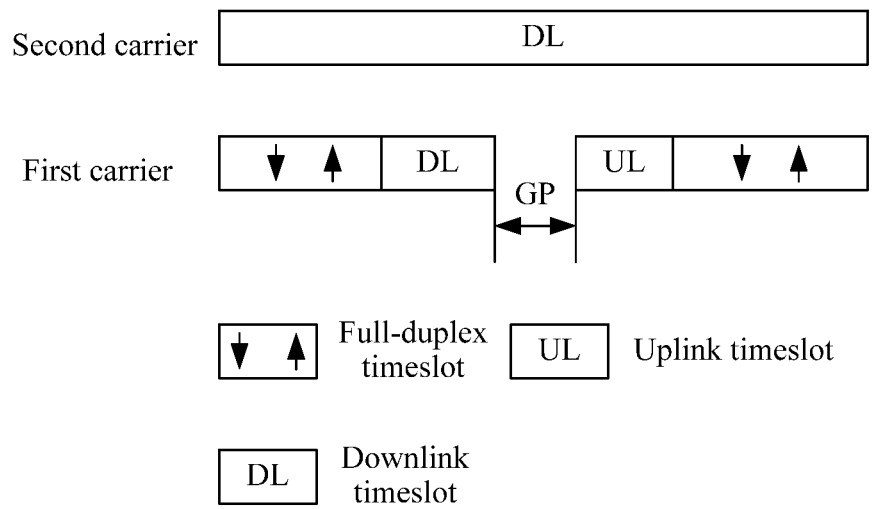
FIG. 4 is a schematic structural diagram of a carrier according to another embodiment of the present invention.

In an existing wireless communications system, in a first case, the wireless access device and the user equipment perform signal sending and reception on a same carrier, for example, in a wireless communications system of a TDD mode. In a second case, sending and reception between the wireless access device and the user equipment are performed respectively on two spectrum-symmetric carriers, for example, in a wireless communications system of an FDD mode. For the first case, a frame structure provided in the embodiments of the present invention may be directly applied to the carrier. For the second case, the frame structure provided in the embodiments of the present invention may be directly applied to the two spectrum-symmetric carriers; or as shown in FIG. 4, the frame structure provided in the embodiments of the present invention is applied to either of two spectrum-symmetric carriers. Specifically, as shown in FIG. 4, a first carrier and a second carrier are time-synchronous and spectrum-paired carriers, where the first carrier successively includes a full-duplex timeslot used for a DL/UL (a downlink timeslot used for the DL, an uplink timeslot used for the UL. A guard period GP of a specific length is set between the downlink timeslot and the uplink timeslot. Optionally, the wireless access device may also use a wireless communication method, provided in the embodiments of the present invention, on both the first carrier and the second carrier in the paired carriers. That is, a radio frame structure used for the first carrier in the implementation of the present invention may be used for both the first carrier and the second carrier in the paired carriers.

In addition, frames of neighboring cells are completely synchronized. That is, for the neighboring cells, uplink timeslots are aligned, downlink timeslots are aligned, and full-duplex timeslots are aligned. A basic composition unit of the full-duplex timeslot, the downlink timeslot, and the uplink timeslot in terms of time is a multiplexing symbol, and one multiplexing symbol may be further divided into multiple subunits in a transform domain. For example, in an orthogonal frequency division multiple access (OFDMA for short) system, the multiplexing symbol is an OFDM symbol, the transform domain may be a frequency domain, the subunit may be a subcarrier, and one OFDM symbol includes multiple subcarriers in the frequency domain; and in a Code Division Multiple Access (CDMA for short) system, the multiplexing symbol is a spread spectrum symbol, the transform domain may be a code domain, the subunit may be a code channel, and one spread spectrum symbol includes code channels corresponding to multiple channel codes in the code domain.

The wireless access device provided in this embodiment can flexibly send a downlink signal, or receive an uplink signal, or send a downlink signal and receive an uplink signal simultaneously in a full-duplex timeslot on at least one carrier; and perform signal sending and reception respectively by using a downlink timeslot and an uplink timeslot. Compared with an existing TDD technology in which only an uplink time period is used to receive an uplink signal and only a downlink time period is used to send a downlink signal, and an existing FDD technology in which an uplink carrier can be only used to receive an uplink signal and a downlink carrier is only used to send a downlink signal, the present invention can improve spectrum utilization in a wireless communications system.

In an implementation manner, the downlink communications unit 22 is specifically configured to send a synchronization channel signal and a broadcast channel signal in the downlink timeslot.

In a wireless cellular system, when accessing a network, the UE first achieves frequency and time synchronization by using a synchronization channel; performs cell searching by receiving a synchronization channel signal, to select a proper cell; further receives a broadcast channel signal of the selected cell after cell selection, to obtain information such as a wireless air interface configuration and a wireless resource of the cell; and then initiates random access (also referred to as non-synchronous random access) by using a random access channel (RACH for short) to access the network. After that, a base station of the cell keeps synchronized with the UE. When accessing the network, the UE needs to receive the synchronization channel signal and the broadcast channel signal; and before the UE is synchronized with the base station, the base station does not know existence of the UE, and therefore the base station may schedule UE near the UE for uplink transmission. To avoid uplink transmission interference from other UE to the UE that performs cell searching, the synchronization channel, a broadcast channel, and the like are arranged in the downlink timeslot. In this case, no UE performs uplink transmission in the entire cell. Therefore, no interference is caused to reception of the synchronization and broadcast channels by the UE.

In an implementation manner, as shown in FIG. 2, the downlink communications unit 22 is configured to: when a service volume of to-be-transmitted downlink data does not exceed a first downlink service volume threshold, send the to-be-transmitted downlink data by using the downlink timeslot; and the uplink communications unit 23 is configured to: when a service volume of to-be-transmitted uplink data does not exceed a first uplink service volume threshold, receive the to-be-transmitted uplink data by using the uplink timeslot.

Optionally, the full-duplex communications unit 21 of the wireless access device is specifically configured to perform one or more of the following operations:

when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot, where the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot, the to-be-transmitted uplink data sent by the user equipment, where the second full-duplex timeslot is only used to receive an uplink signal.

A baseband processing resource needs to be occupied for self-interference cancellation processing when the base station performs full-duplex transmission in the full-duplex timeslot, and in addition, residual self-interference also affects a signal to interference plus noise ratio (SINR for short) of a received signal. Therefore, when the service volume of the to-be-transmitted downlink data does not exceed the first downlink service volume threshold, the base station sends a downlink signal only in the downlink timeslot; when the service volume of the to-be-transmitted uplink data does not exceed the first uplink service volume threshold, the base station receives an uplink signal only in the uplink timeslot.

When the service volume of the to-be-transmitted downlink data is greater than the first downlink service volume threshold, and the service volume of the to-be-transmitted uplink data is less than the second uplink service volume threshold, and/or when the service volume of the to-be-transmitted uplink data is greater than the first uplink service volume threshold, and the service volume of the to-be-transmitted downlink data is less than the second downlink service volume threshold, the base station always schedules transmission in a half-duplex manner preferentially. Specifically, according to a service volume of to-be-transmitted data, downlink-first transmission is statically or dynamically performed in the first full-duplex timeslot (that is, only a downlink signal is sent in the first full-duplex timeslot), or uplink-first transmission is statically or dynamically performed in the second full-duplex timeslot (that is, only an uplink signal is received in the second full-duplex timeslot). Preferably, a same preferential transmission configuration is used for full-duplex timeslots of neighboring cells. For example, for two neighboring cells, full-duplex timeslots for downlink-first transmission are aligned, and full-duplex timeslots for uplink-first transmission are aligned. When the base station has a signal to be sent to UE, if the downlink timeslot has sufficient channel resources, the downlink signal is sent to the UE by using the channel resources in the downlink timeslot; when the downlink timeslot has no sufficient channel resources, if a service volume of to-be-transmitted uplink data is less than the second uplink service volume threshold, sufficient channel resources may be allocated to a full-duplex timeslot for downlink-first transmission in full-duplex timeslots, and in this case, the signal is sent to the UE by using the channel resources in the full-duplex timeslot for downlink-first transmission. Similarly, when UE has an uplink signal to be sent to the base station, if the uplink timeslot has sufficient channel resources, the uplink signal is sent to the base station by using the channel resources in the uplink timeslot; when the uplink timeslot has no sufficient channel resources, if a service volume of to-be-transmitted downlink data is less than the second downlink service volume threshold, sufficient channel resources may be allocated to a full-duplex timeslot for uplink-first transmission in full-duplex timeslots, and in this case, the uplink signal is sent to the base station by using the channel resources in the full-duplex timeslot for uplink-first transmission. The base station starts to send a downlink signal and receive an uplink signal simultaneously in some or all timeslots in the full-duplex timeslots only when all the full-duplex timeslots are already allocated as a first full-duplex timeslot and/or a second full-duplex timeslot and there is still to-be-transmitted uplink and/or downlink data. When the service volume of the to-be-transmitted downlink data is greater than the second downlink service volume threshold and/or the service volume of the to-be-transmitted uplink data is greater than the second uplink service volume threshold, transmission is scheduled in the full-duplex timeslot in a full-duplex transmission manner, thereby avoiding, to the greatest extent, interference occurring when signal sending and signal reception are simultaneously performed in the full-duplex timeslot.

Figure 5:
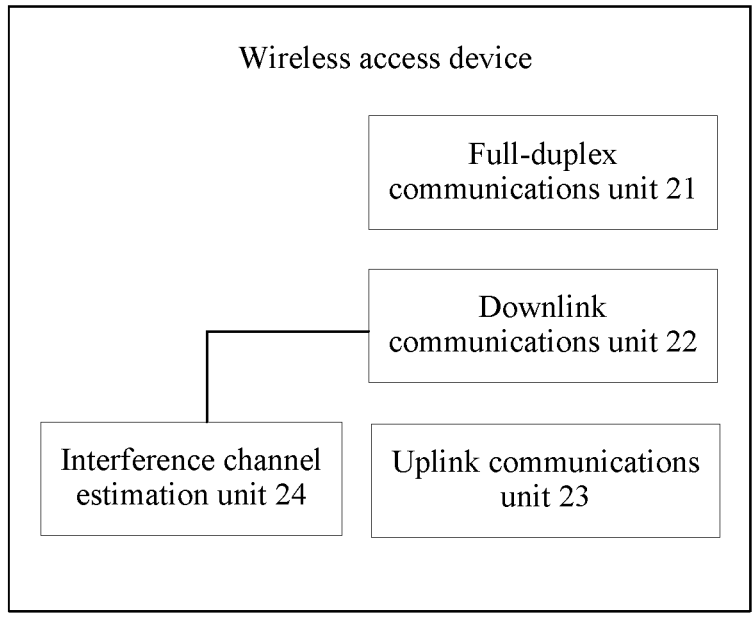
FIG. 5 is a schematic structural diagram of a wireless access device according to another embodiment of the present invention.

In animplementation manner, as shown in FIG. 5, the wireless access device further includes: an interference channel estimation unit 24, specifically configured to obtain an estimation of a self-interference channel matrix of the wireless access device by using the downlink signal sent in the downlink timeslot.

It may be understood that the base station needs to estimate the self-interference channel to support full-duplex transmission, which requires that only the base station is allowed to perform downlink transmission and that the UE cannot perform uplink transmission when the base station estimates the self-interference channel; otherwise, self-interference channel estimation by the base station is interfered. Therefore, the base station estimates the self-interference channel in the downlink timeslot. Because the base station is usually static, the self-interference channel of the base station may be assumed to be almost unchanged at least in a time of one radio frame.

Further, as described above, the base station may always schedule transmission in the half-duplex manner preferentially. Therefore, when the base station needs to estimate the self-interference channel to perform a full-duplex operation, resource utilization of the downlink timeslot is already quite high, that is, almost all channel resources in the downlink timeslot are already used to transmit signaling and user data in the downlink. In this case, the base station may use a known transmitted downlink signal as a reference signal in the downlink timeslot, to obtain an estimation of the self-interference channel. Specifically, the downlink timeslot includes L multiplexing symbols in a time domain, and each of the multiplexing symbols includes K transform-domain subunits in a transform domain. It may be learned from the foregoing embodiment that the transform domain may be a frequency domain, the multiplexing symbol may be an OFDM symbol, and the transform-domain subunit may be a subcarrier. The base station has M transmit antennas and N receive antennas.

The interference channel estimation unit 24 is specifically configured to: obtain a downlink signal vector of $x(k)=[x_0(k), x_1(k), \ldots, x_{M-1}(k)]^T$ transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtain, according to the downlink signal vector, a self-interference signal $y_n(k)=x^T(k)h_n$ that is received by the wireless access device on the $n^{th}$ receive antenna, where $n=0, 1, \ldots, N-1$, N is a quantity of receive antennas of the wireless access device, $h_n=[h_{n,0}, h_{n,1}, \ldots, h_{n, M-1}]^T$, and $h_{n,m}$ ($n=0, 1, \ldots, N-1, m=0, 1, \ldots, M-1$) is an element in the $n^{th}$ row and the $m^{th}$ column of the to-be-estimated N×M-dimensional self-interference channel matrix of the wireless access device;

obtain, according to the self-interference signal on the L multiplexing symbols that is received by the $n^{th}$ receive antenna, linear equations $y_n=X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtain the estimation of the self-interference channel matrix of the wireless access device according to the linear equations $y_n=X^T h_n$, for example, by solving the linear equations $y_n=X^T h_n$.

Figure 6:
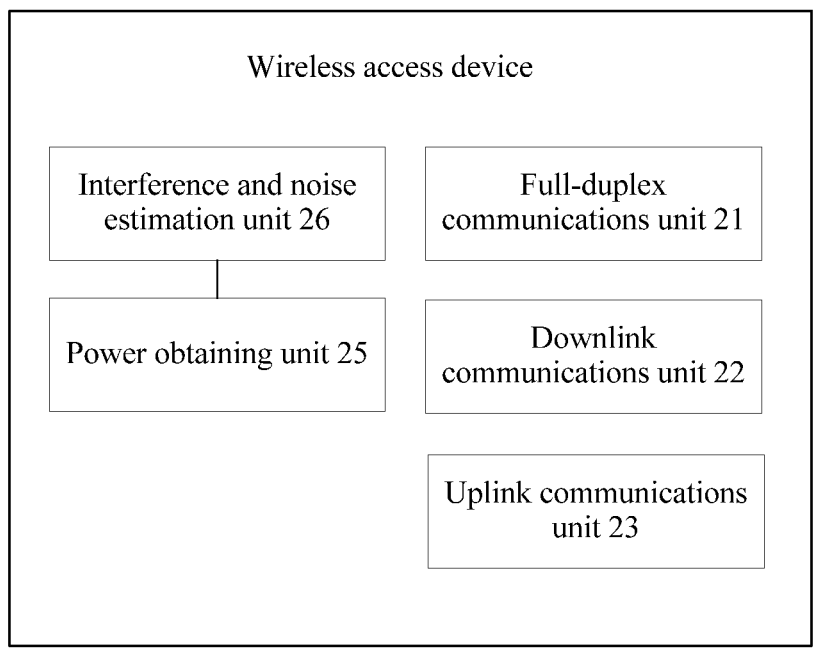
FIG. 6 is a schematic structural diagram of a wireless access device according to still another embodiment of the present invention.

Further, as shown in FIG. 6, in a manner, the wireless access device further includes: a power obtaining unit 25 and an interference and noise estimation unit 26.

The power obtaining unit 25 is configured to obtain a receive power of the uplink signal sent to the user equipment.

The interference and noise estimation unit 26 is configured to obtain an estimation of an uplink interference and noise floor of full-duplex communication.

The uplink communications unit 23 is specifically configured to: when a ratio of the receive power obtained by the power obtaining unit 25 to the estimation, obtained by the interference and noise estimation unit 26, of the uplink interference and noise floor of full-duplex communication is less than a second threshold, receive the uplink signal that is sent by the user equipment in the uplink timeslot.

It may be understood that, when the base station performs reception and sending simultaneously in a full-duplex manner on a same frequency band, a signal transmitted by the base station in a downlink direction becomes an interference signal for reception in an uplink direction by a base station of a neighboring cell. In this case, downlink transmission co-channel interference may occur. In addition, a specific quantity of residual self-interference signals also exist because self-interference cancellation (SIC for short) performance of the base station is limited due to multiple factors such as a hardware capability and a wireless propagation environment. Therefore, an uplink signal of the base station in the full-duplex timeslot includes downlink transmission co-channel interference from a neighboring cell and residual self-interference of the base station. Therefore, after obtaining the estimation of the self-interference channel in the downlink timeslot, the base station may perform, in remaining time of the downlink timeslot by using the obtained estimation of the self-interference channel, self-interference cancellation for an uplink signal that is received by the base station on a receive antenna, and obtain an estimation of a receive power of an uplink signal that is received by the base station on the receive antenna in this case. When the base station performs self-interference channel estimation in the downlink timeslot, the UE scheduled by the base station does not perform uplink transmission in this process. Therefore, a received signal received on the receive antenna after self-interference cancellation mainly comes from the downlink transmission co-channel interference of the neighboring cell and the residual self-interference of the base station. Therefore, in the downlink timeslot, a signal power obtained by the base station on the receive antenna is an estimation of an uplink interference and noise floor during full-duplex transmission. That is, during full-duplex transmission, an interference signal in an uplink signal includes at least the uplink interference and noise floor. The uplink interference and noise floor is a common technical term in the field of communications technologies, and is not explained herein.

In another aspect, an uplink signal of cell-edge UE undergoes a relatively large propagation path loss, a receive power of the base station for the uplink signal is quite low, and the uplink signal is affected by the uplink interference and noise floor to a relatively great extent during full-duplex transmission. Therefore, the base station should preferentially allocate a channel resource in the uplink timeslot to this type of cell-edge UE for uplink transmission. Therefore, the power obtaining unit 25 of the base station may obtain a receive power of the uplink signal of the UE by using the prior art. When a ratio of the receive power of the uplink signal of the UE to the estimation of the uplink interference and noise floor of full-duplex communication is less than the second threshold, it may be understood that the power of the received signal is relatively low, and the received signal is affected to a relatively great extent by the uplink interference and noise floor during full-duplex timeslot signal transmission. In this case, an uplink channel resource in the uplink timeslot is preferentially allocated to the UE for uplink transmission, to avoid a signal reception failure caused by interference. When a ratio of the receive power of the uplink signal of the UE to the estimation of the uplink interference and noise floor of full-duplex communication is greater than or equal to the second threshold, it may be understood that the power of the received signal is relatively high, and the received signal is affected to a relatively small extent by the uplink interference and noise floor during full-duplex timeslot signal transmission; only in this case, an uplink channel resource in the full-duplex timeslot is allocated to the UE for uplink transmission.

In a manner, the uplink communications unit 23 is specifically configured to receive, in the uplink timeslot, a random access signal sent by the user equipment.

It may be understood that, for UE that has not been synchronized with the base station, the base station cannot schedule and control transmission of the UE. If non-synchronous random access is performed in the full-duplex timeslot, it is possible that other UE near the UE is performing downlink reception in the timeslot, and a signal transmitted by the UE that performs non-synchronous random access causes interference to the neighboring UE that is performing downlink reception. Therefore, in a non-synchronous random access process of the user equipment, the random access signal is sent by using the uplink timeslot.

Optionally, referring to FIG. 2, the full-duplex communications unit 21 is specifically configured to perform one or more of the following operations:

sending a downlink signal to first user equipment on a first channel resource in the full-duplex timeslot; or receiving, on a second channel resource in the full-duplex timeslot, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain, where the transform domain may be a frequency domain, and the channel resource may be a channel frequency resource block.

Figure 7:
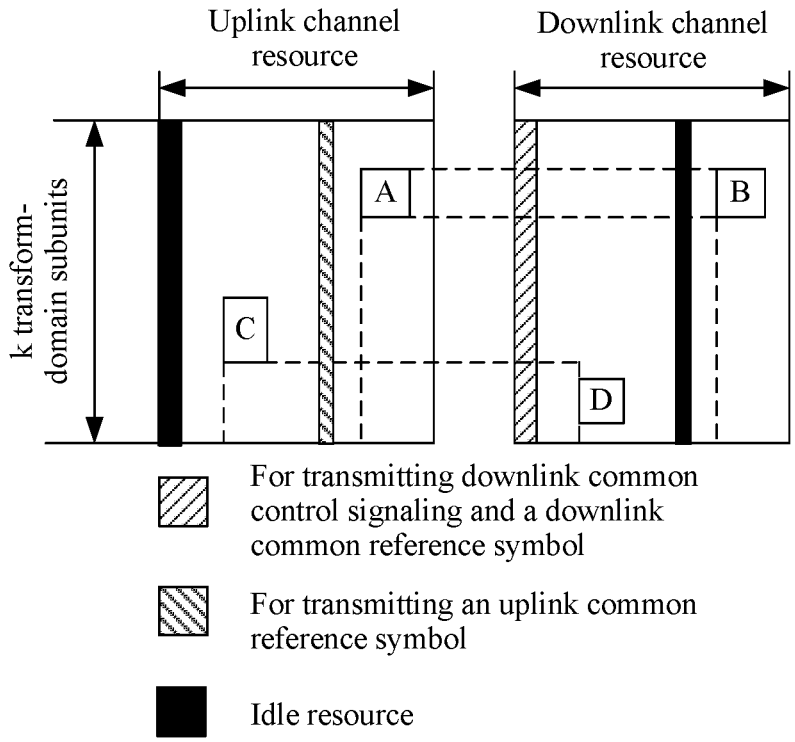
FIG. 7 is a schematic diagram of resource configuration of a full-duplex timeslot according to an embodiment of the present invention.

For example, the base station schedules two pairs of user equipments, that is, UE1 and UE2, and UE3 and UE4, to perform point-to-multipoint full-duplex communication. When a path loss between the UE1 and the UE2 is greater than or equal to the first threshold (for example, a distance between the UE1 and the UE2 is greater than or equal to a preset value), transmission of an uplink signal by the UE2 does not cause interference to reception of a downlink signal by the UE1 that is transmitted by the base station simultaneously at a same frequency. Therefore, as shown in FIG. 7, an uplink channel resource A in a full-duplex timeslot is allocated to the UE1 for sending an uplink signal to the base station, and a downlink channel resource B in the full-duplex timeslot is allocated to the UE2 for receiving a downlink signal from the base station, where the channel resource A and the channel resource B partially or completely overlap in the time domain, and partially or completely overlap in the transform domain. In addition, when a path loss between the UE3 and the UE4 is less than the first threshold (for example, a distance between the UE3 and the UE4 is less than the preset value), transmission of an uplink signal by the UE4 causes specific interference to reception of a downlink signal by the UE3 that is transmitted by the base station simultaneously at a same frequency. Therefore, as shown in FIG. 7, the base station allocates an uplink channel resource C in the full-duplex timeslot to the UE3 for sending uplink data to the base station, and allocates a downlink channel resource D in the full-duplex timeslot to the UE4 for receiving downlink data from the base station. Because the channel resource C and the channel resource D do not overlap in the transform domain (C and D are orthogonal), specific separation may be obtained between the UE3 and the UE4, so that interference from transmission of the UE4 to reception of the UE3 is reduced.

Optionally, as shown in FIG. 2, the full-duplex communications unit 21 sends a first control signal to the user equipment by using at least one first multiplexing symbol in the full-duplex timeslot, where the first control signal includes downlink common control signaling and a downlink common reference symbol, and the first multiplexing symbol is only used to send a signal; and the full-duplex communications unit 21 receives, by using at least one second multiplexing symbol in the full-duplex timeslot, a second control signal sent by the user equipment, where the second control signal includes an uplink common reference symbol, and the second multiplexing symbol is only used to receive a signal.

It may be understood that, after obtaining the estimation of the self-interference channel matrix, the base station and/or the UE may perform full-duplex communication in the full-duplex timeslot. Preferably, when uplink and downlink physical channels are being designed, in terms of time, the first multiplexing symbol for transmitting the downlink common control signaling, the downlink common reference symbol and the like on the downlink physical channel is separated from the second multiplexing symbol for transmitting the uplink common reference symbol and the like on the uplink physical channel. The control signals are more important than user data. Therefore, in the full-duplex timeslot, multiplexing symbols for transmitting the information are no longer allocated to an opposite transmission direction, so that impact of system self-interference on transmission of the important information is reduced, as shown in FIG. 7.

Regardless of whether in a point-to-multipoint or point-to-point full-duplex communication manner, if UE for uplink transmission and UE for downlink reception are too close to each other, the UE for uplink transmission causes quite strong interference to the UE for downlink reception, and consequently, the UE for downlink reception cannot receive a downlink signal from the base station. Therefore, during full-duplex scheduling, the base station should avoid using some of two UEs or at least two UEs that are too close to each other for uplink transmission and using the others for downlink reception. Therefore, UE needs to obtain, by means of measurement, information about neighboring UE, and report the information to the base station, so that the base station uses the information to perform effective full-duplex scheduling, thereby avoiding mutual interference between UEs.

Figure 8:
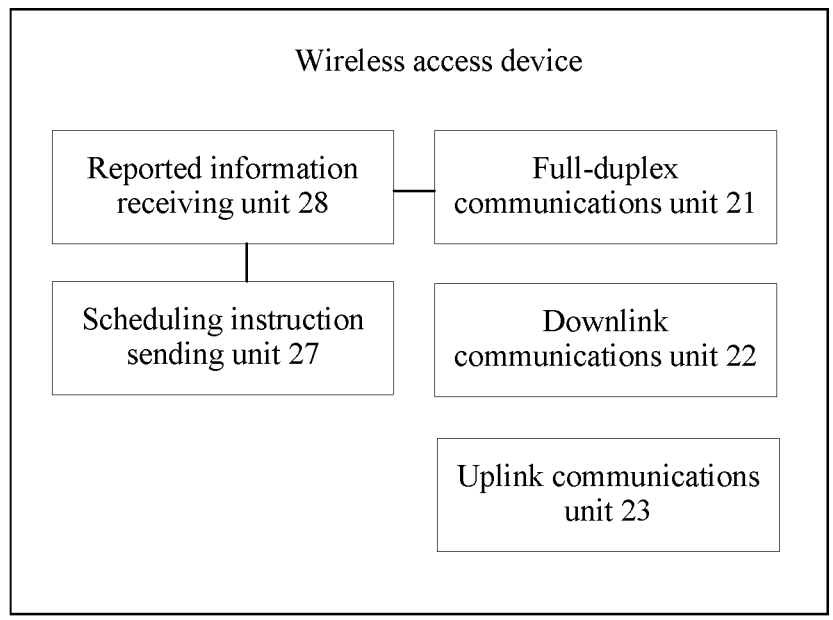
FIG. 8 is a schematic structural diagram of a wireless access device according to yet another embodiment of the present invention.

Further, as shown in FIG. 8, the wireless access device further includes: a scheduling instruction sending unit 27 and a reported information receiving unit 28.

The scheduling instruction sending unit 27 is configured to send a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot.

The reported information receiving unit 28 is configured to receive a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

Optionally, the neighboring user equipment list further includes a path loss between the at least one user equipment served by the wireless access device and the at least one other user equipment served by the wireless access device.

It may be understood that the base station allocates a specific channel resource (that is, the first channel) in the uplink timeslot to the UE for sending a beacon signal according to a specific cycle. A channel resource for sending the beacon signal in the uplink timeslot is referred to as a beacon channel. In this embodiment, the beacon channel is the first channel. Each UE measures a beacon signal of other UE on the beacon channel, where the beacon signal includes at least information such as a UE identifier (UE ID). Preferably, each UE randomly sends a beacon signal by using a variable cycle. In this case, a probability that neighboring UEs send a beacon signal simultaneously is greatly reduced. In addition, each UE transmits the beacon signal by using a relatively low fixed power. Therefore, UEs that are spaced apart by more than a specific distance do not receive a beacon signal sent by each other, and only UEs at a relatively short distance can receive a beacon signal of each other. In this way, if two or at least two UEs are close to each other, for example, are spaced apart by a few meters, a beacon signal sent by any UE has a quite high SINR when arriving at neighboring other UE. Therefore, each UE may measure a beacon signal sent by neighboring UE of the UE, to obtain an identifier of the neighboring other UE of the UE. In addition, a received signal power $P_{in}^{b}$ of the beacon signal transmitted by the neighboring other UE may be further estimated. Because each UE transmits a beacon signal by using a fixed power $P_{TX}^{b}$, the UE may obtain an estimation of a path loss between the UE and neighboring other UE:

$$PL_{UE-UE}(dB)=P_{TX}^{b}(dB)-B_{in}^{b}(dB)$$

Therefore, UE may obtain information about neighboring other UE, and report information about the UE and the neighboring other UE to the base station in a form of a neighboring user equipment list, where the neighboring user equipment list may include information such as an identifier of the any UE, an identifier of at least one neighboring other UE, and an estimation of a path loss between the any UE and the at least one neighboring other UE. If no beacon signal transmitted by any neighboring UE is detected by UE, it indicates that there is no other UE at a relatively short distance from the UE. The base station performs user equipment scheduling in the full-duplex timeslot by using information about neighboring UE and reported by each UE, to avoid scheduling some of two or at least two UEs that are too close to each other for uplink sending and scheduling the others for downlink reception, thereby avoiding mutual interference between UEs.

Specifically, as shown in FIG. 1, a distance between every two of UE1, UE2, and UE3 is less than or equal to a first distance, and each of the UE1, the UE2, and the UE3 can detect UE IDs in beacon signals sent by the other two UEs. The beacon signals that are received by each of the UE1, UE2, and UE3 and are from the other two UEs have relatively strong received signal strength. Therefore, a path loss between the UEs is less than or equal to the preset first threshold. After obtaining information that is reported by the UEs by using a neighboring user equipment list, the base station schedules the UEs only for uplink sending or only for downlink reception simultaneously in the full-duplex timeslot. Similarly, a path loss between UE4 and UE5 is less than the preset first threshold, and the base station schedules the UEs only for uplink transmission or only for downlink reception simultaneously in the full-duplex timeslot.

The UE1 and the UE4 are spaced apart by a relatively long distance, and the two UEs cannot receive a beacon signal sent by each other. Therefore, in the full-duplex timeslot, when scheduling one of the UE1 and the UE4 for uplink transmission, the base station may schedule the other one for downlink transmission.

Still as shown in FIG. 1, UE6 is spaced apart from the UE1, the UE2, and the UE3 by a relatively short distance, and a distance between the UE6 and each of the UE1, the UE2, and the UE3 is greater than the first distance and is less than or equal to a second distance. Therefore, at least one UE in the UE1, the UE2, the UE3, and the UE6 can detect a UE ID carried in a beacon signal sent by at least one other UE. Therefore, the base station determines that a path loss between the UE6 and each of the UE1, the UE2, and the UE3 is greater than the first threshold and is less than the second threshold. In this case, there is specific co-channel transmit-receive mutual interference between the UE6 and each of the UE1, UE2, and UE3, and the following needs to be met for full-duplex timeslot allocation: an uplink channel resource that may be allocated by the base station to the UE6 and a downlink channel resource allocated to the UE1 (which may certainly be the UE2 or the UE3) are mutually orthogonal or almost orthogonal, and similarly, a downlink channel resource allocated to the UE6 and an uplink channel resource allocated to the UE1 (which may certainly be the UE2 or the UE3) are mutually orthogonal or almost orthogonal. Therefore, mutual interference between the UEs is effectively reduced. Similarly, mutual interference between UE7 and each of the UE4 and the UE5 in FIG. 1 may also be reduced in this manner.

In addition, this embodiment of the present invention provides a structure of a radio frame of the wireless access device. The radio frame includes sub-frames #0 to #9. The first downlink timeslot includes a downlink pilot timeslot in the sub-frame #6, and the first uplink timeslot includes an uplink pilot timeslot in the sub-frame #6. Optionally, a first guard period is set between a downlink pilot timeslot in the sub-frame #1 and an uplink pilot timeslot in the sub-frame #1. Alternatively, the radio frame includes sub-frames #0 to #9. The first downlink timeslot includes a downlink pilot timeslot in the sub-frame #6, and the first uplink timeslot includes an uplink pilot timeslot in the sub-frame #6. Optionally, a second guard period is set between the downlink pilot timeslot in the sub-frame #6 and the uplink pilot timeslot in the sub-frame #6.

Figure 9:
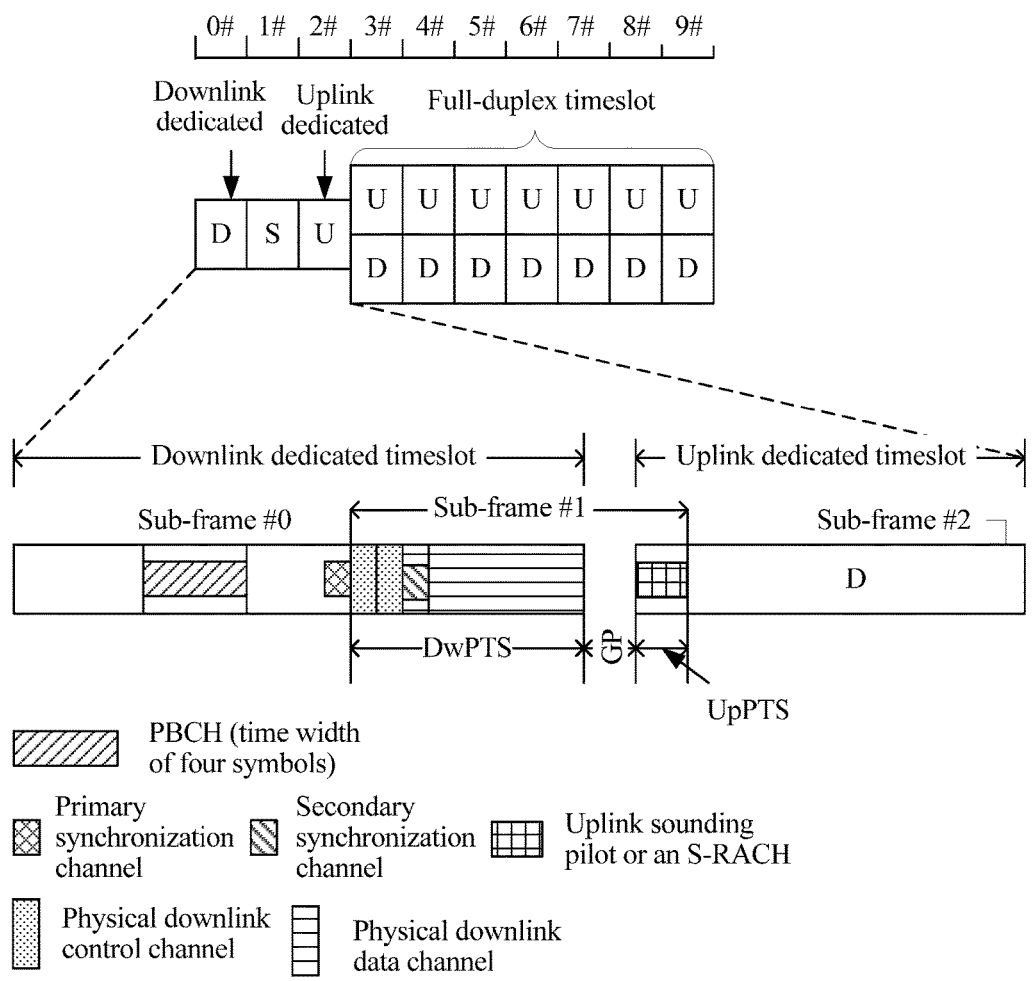
FIG. 9 is a schematic structural diagram of a radio frame according to an embodiment of the present invention.

Specifically, as shown in FIG. 9, a structure of a radio frame supporting full-duplex communication on a carrier is shown. Each sub-frame in FIG. 9 is 2 ms and occupies two timeslots, and a frame structure of the sub-frame is obtained by means of extension from an existing LTE-TDD frame structure. For detailed descriptions of the existing LTE-TDD frame structure, reference may be made to the 3GPP technical specification TS 36.211 V12.0.0 (2013-12). In the existing LTE-TDD frame structure, a sub-frame #0 and a downlink pilot timeslot (DwPTS for short) in a sub-frame #1 are configured as a downlink timeslot, an uplink pilot timeslot (UpPTS for short) in the sub-frame #1 and a sub-frame #2 are configured as an uplink timeslot, and sub-frames #3 to #9 are configured as a full-duplex timeslot. In this way, a synchronization channel and a broadcast channel in the existing LTE-TDD frame structure, that is, a primary synchronization channel (PSCH for short), a secondary synchronization channel (SSCH for short), and a physical broadcast channel (PBCH for short) are located in the sub-frame #0 and the downlink pilot timeslot (DwPTS for short) in the sub-frame #1, that is, are located in the downlink timeslot. A channel resource except the synchronization and broadcast channels in the downlink timeslot may be used by the base station to perform downlink transmission, for example, to send a downlink reference symbol and downlink user data. In addition, the base station obtains the estimation of the self-interference channel by using the known transmitted downlink signal, for self-interference cancellation in the full-duplex timeslot. FIG. 9 further shows a physical downlink control channel and a physical downlink data channel in the sub-frame #1 that are used to implement the foregoing transmission function. The UpPTS in the sub-frame #1 includes an uplink pilot sounding signal or a short random access channel (S-RACH for short). In the uplink timeslot, the base station schedules UE with a relatively low signal to interference plus noise ratio (SINR for short) such as a cell-edge user equipment for uplink transmission, allocates some channel resources for non-synchronous random access of the UE, and allocates some channel resources for beacon signal transmission of the UE. In addition, if the UE supports full-duplex communication, the UE may obtain an estimation of a self-interference channel by using an opportunity of transmitting uplink data or a beacon signal.

Figure 10:
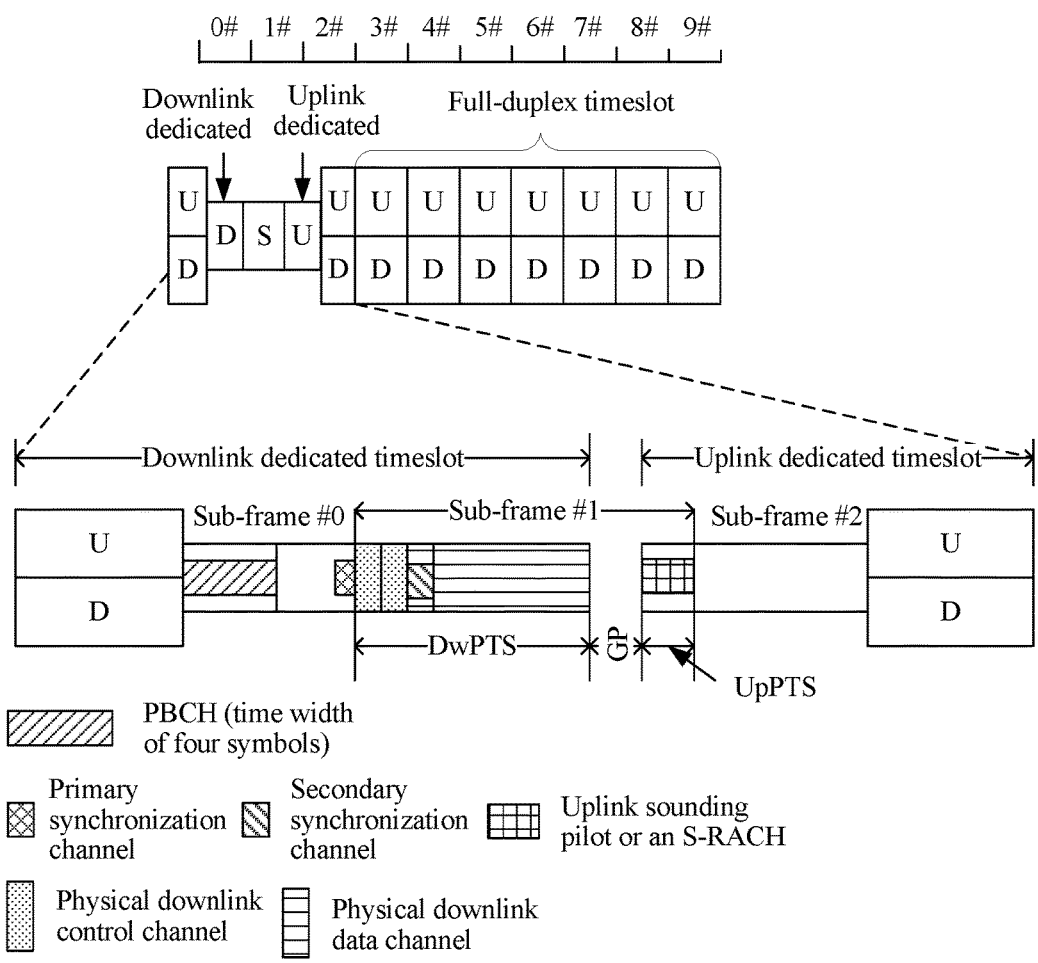
FIG. 10 is a schematic structural diagram of a radio frame according to another embodiment of the present invention.

Referring to FIG. 10, another structure of a radio frame supporting full-duplex communication is shown. A second half frame in a sub-frame #0 and a downlink pilot timeslot in a sub-frame #1 are used as a downlink timeslot, an uplink pilot timeslot in the sub-frame #1 and a first half frame in a sub-frame #2 are used as an uplink timeslot, and a first half frame in the sub-frame #0, a second half frame in the sub-frame #2, and sub-frames #3 to #9 are used as a full-duplex timeslot, where a first guard period is set between the downlink pilot timeslot in the sub-frame #1 and the uplink pilot timeslot in the sub-frame #1.

The structure may be specifically an improvement to the existing LTE-TDD frame structure: The second half frame (a timeslot #1) in the sub-frame #0 and the DwPTS in the sub-frame #1 are configured as the downlink timeslot, the UpPTS in the sub-frame #1 and the first half frame (a timeslot #4) in the sub-frame #2 are configured as the uplink timeslot, and the sub-frames #3 to #9, the first half frame (a timeslot #0) in the sub-frame #0, and the second half frame (a timeslot #5) in the sub-frame #2 are configured as the full-duplex timeslot.

Figure 11:
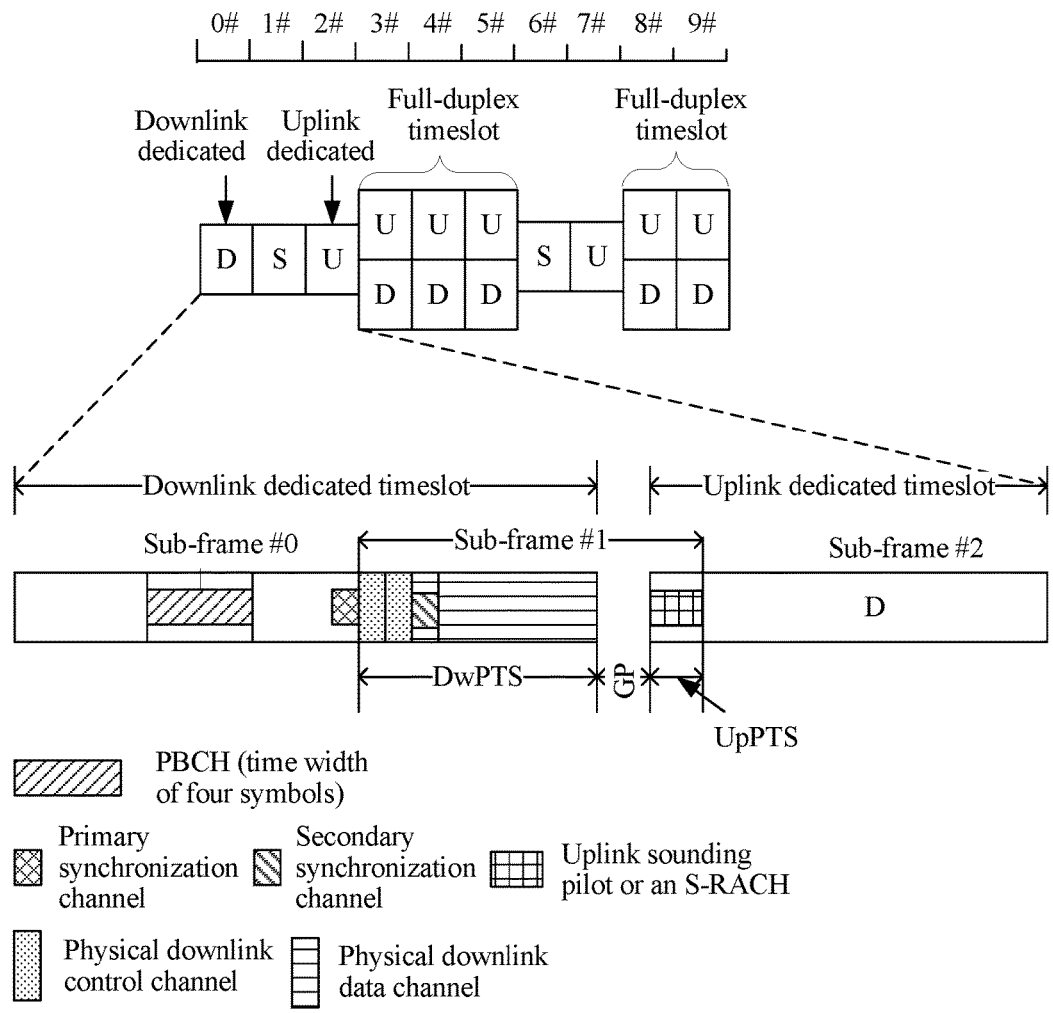
FIG. 11 is a schematic structural diagram of a radio frame according to still another embodiment of the present invention.

Referring to FIG. 11, an improvement to the structure of the radio frame supporting full-duplex shown in FIG. 9 is provided. A sub-frame #0 and a downlink pilot timeslot in a sub-frame #1 are used as a downlink timeslot, an uplink pilot timeslot in the sub-frame #1 and a sub-frame #2 are used as a uplink timeslot, sub-frames #3, #4, #5, #8, and #9 are used as a full-duplex timeslot, a sub-frame #6 includes a downlink pilot timeslot, a second guard period, and an uplink pilot timeslot, and a sub-frame #7 is used as an uplink sub-frame, where a first guard period is set between the downlink pilot timeslot in the sub-frame #1 and the uplink pilot timeslot in the sub-frame #1.

Herein, the existing LTE-TDD frame structure in the 3GPP technical specification TS 36.211 V12.0.0 (2013-12) is directly used for the sub-frame #6 and the sub-frame #7 in FIG. 11. The sub-frame #6 in FIG. 9 is configured as a transition frame that includes a downlink pilot timeslot, a second guard period, and an uplink pilot timeslot, and the sub-frame #7 is configured as an uplink sub-frame.

Figure 12:
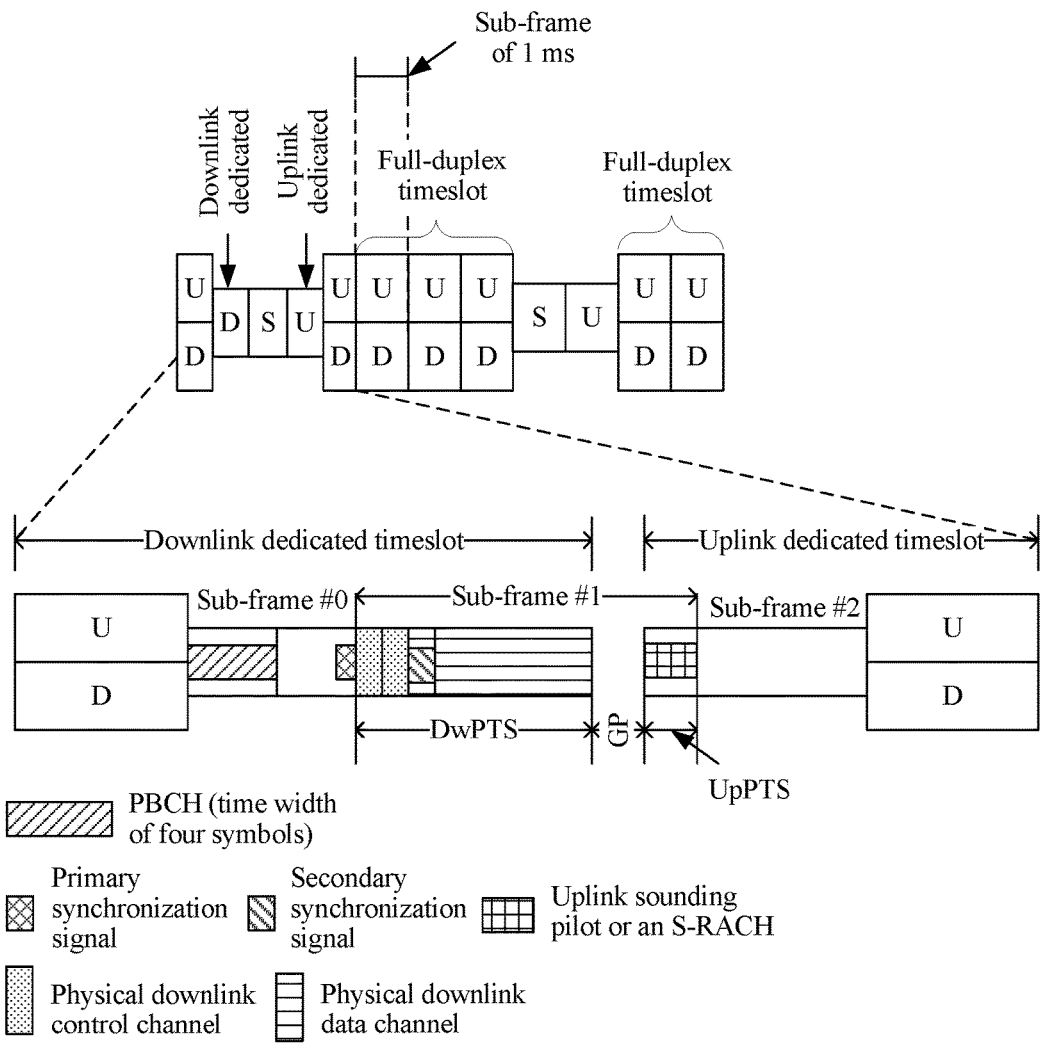
FIG. 12 is a schematic structural diagram of a radio frame according to yet another embodiment of the present invention.

Referring to FIG. 12, an improvement to the structure of the radio frame supporting full-duplex shown in FIG. 10 is provided. A second half frame in a sub-frame #0 on the first carrier and a downlink pilot timeslot in a sub-frame #1 are used as a downlink timeslot, an uplink pilot timeslot in the sub-frame #1 and a first half frame in a sub-frame #2 are used as a uplink timeslot, a first half frame in the sub-frame #0, a second half frame in the sub-frame #2, and sub-frames #3, #4, #5, #8, and #9 are used as a full-duplex timeslot, a sub-frame #6 includes a downlink pilot timeslot, a second guard period, and an uplink pilot timeslot, and a sub-frame #7 is used as an uplink sub-frame, where a first guard period is set between the downlink pilot timeslot in the sub-frame #1 and the uplink pilot timeslot in the sub-frame #1.

Herein, the existing LTE-TDD frame structure in the 3GPP technical specification TS 36.211 V12.0.0 (2013-12) is directly used for the sub-frame #6 and the sub-frame #7 in FIG. 12. The sub-frame #6 in FIG. 12 is configured as a transition frame that includes a downlink pilot timeslot, a second guard period, and an uplink pilot timeslot, and the sub-frame #7 is configured as an uplink sub-frame.

Referring to the frame structures provided in FIG. 9 and FIG. 10, compared with an uplink-downlink configuration ratio 1:3 in a TDD mode in the prior art, in the present invention, transmission bandwidth in an uplink and transmission bandwidth in a downlink are increased by 325% and 38% respectively. If an average length of DwPTSs in timeslots S is half a sub-frame, 2 U+6 D+2 S in TDD may provide 6.5 downlink transmission time windows and 2 uplink transmission time windows, and a configuration of 8.5 U+8.5 D+1 S in the present invention may provide 9 downlink transmission time windows and 8.5 uplink transmission time windows.

Referring to the 3GPP technical specification TS 36.211 V12.0.0 (2013-12), it may be understood that the frame structures provided in FIG. 9 and FIG. 10 may be used for a first carrier in a scenario of performing wireless communication by using spectrum-symmetric paired carriers (such as the first carrier and the second carrier shown in FIG. 4). In this case, the wireless communications system further performs downlink transmission by using a second carrier. Compared with an overall spectrum resource configuration ratio 1:1 of uplink and downlink carriers in FDD in the prior art, transmission bandwidth in the downlink may be increased by 90% in the present invention. Compared with use of an FDD uplink carrier in a time division manner according to the uplink-downlink spectrum resource configuration ratio 1:1 (where an overall uplink-downlink configuration ratio 1:3 is ensured), in the present invention, 70% and 23% bandwidth gains may be obtained for the uplink and the downlink respectively. On a per-sub-frame basis, spectrum resources on uplink and downlink carriers in an existing FDD system are 10 U+10 D. If an average length of DwPTSs in timeslots S is half a sub-frame, a spectrum resource configuration of 8.5 U+19 D+1 S can be implemented for uplink and downlink carriers in the present invention, so that 19 downlink transmission time windows and 8.5 uplink transmission time windows can be provided. Because most services are asymmetric data services, slight reduction of uplink bandwidth may be ignored, and 90% bandwidth gains may be obtained for the downlink.

When spectrum resources on an FDD uplink carrier are used in a time division manner according to an uplink-downlink configuration ratio 1:1, spectrum resources on uplink and downlink carriers are 5 U+15.5 D. A configuration of 8.5 U+19 D+1 S can be implemented in the present invention, so that 70% bandwidth gains are obtained for the uplink, and 23% bandwidth gains are obtained for the downlink.

According to the wireless access device provided in this embodiment of the present invention, downlink signal sending, or uplink signal reception, or simultaneous downlink signal sending and uplink signal reception can be flexibly performed in a full-duplex timeslot on at least one carrier; and signal sending and reception are performed respectively by using a downlink timeslot and an uplink timeslot. Compared with an existing TDD technology in which only an uplink time period is used to receive an uplink signal and only a downlink time period is used to send a downlink signal, and an existing FDD technology in which an uplink carrier can be only used to receive an uplink signal and a downlink carrier is only used to send a downlink signal, the present invention can improve spectrum utilization in a wireless communications system.

Figure 13:
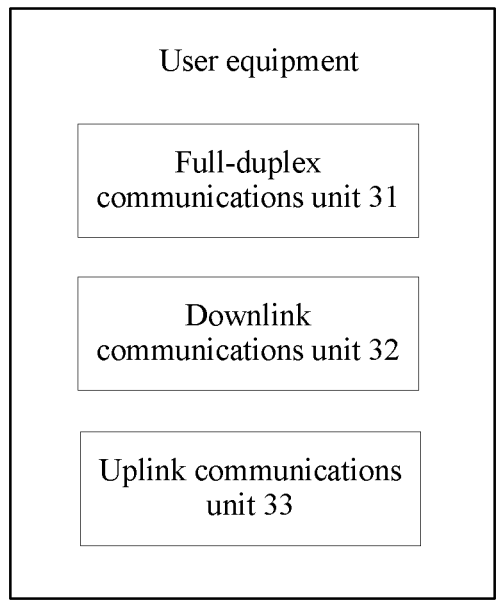
FIG. 13 is a schematic structural diagram of user equipment according to an embodiment of the present invention.

As shown in FIG. 13, an embodiment of the present invention provides user equipment. The user equipment communicates with the wireless access device, provided in the foregoing embodiment, on a first carrier by using at least three timeslots, and the at least three timeslots include at least one full-duplex timeslot, at least one downlink timeslot, and at least one uplink timeslot. The user equipment includes:

a full-duplex communications unit 31, configured to perform one or more of signal sending or signal reception in the full-duplex timeslot;

a downlink communications unit 32, configured to receive a downlink signal in the downlink timeslot; and an uplink communications unit 33, configured to send an uplink signal in the uplink timeslot.

As shown in FIG. 3, the first carrier provided in this embodiment of the present invention successively includes a full-duplex timeslot used for a DL/UL, a downlink timeslot used for the DL, and an uplink timeslot used for the UL. Optionally, a guard period (GP for short) is set between the downlink timeslot and the uplink timeslot. In this period, a base station neither transmits a signal nor receives a signal. A function of the guard period is to avoid interference caused when a signal transmitted by a base station of a neighboring cell in a downlink timeslot has a relatively long propagation delay and is received by a base station of a cell in an uplink timeslot of this cell.

In an existing wireless communications system, in a first case, the wireless access device and the user equipment perform signal sending and reception on a same carrier, for example, in a wireless communications system of a TDD mode. In a second case, sending and reception between the wireless access device and the user equipment are performed respectively on two spectrum-symmetric carriers, for example, in a wireless communications system of an FDD mode. For the first case, a frame structure provided in the embodiments of the present invention may be directly applied to the carrier. For the second case, the frame structure provided in the embodiments of the present invention may be directly applied to the two spectrum-symmetric carriers; or as shown in FIG. 4, the frame structure provided in the embodiments of the present invention is applied to either of two spectrum-symmetric carriers. Specifically, as shown in FIG. 4, a first carrier and a second carrier are time-synchronous and spectrum-paired carriers, where the first carrier successively includes a full-duplex timeslot used for a DL/UL, a downlink timeslot used for the DL, an uplink timeslot used for the UL. A guard period GP of a specific length is set between the downlink timeslot and the uplink timeslot. Optionally, the wireless access device may also use a wireless communication method, provided in the embodiments of the present invention, on both the first carrier and the second carrier in the paired carriers. That is, a radio frame structure used for the first carrier in the implementation of the present invention may be used for both the first carrier and the second carrier in the paired carriers.

In addition, frames of neighboring cells are completely synchronized. That is, for the neighboring cells, uplink timeslots are aligned, downlink timeslots are aligned, and full-duplex timeslots are aligned. A basic composition unit of the full-duplex timeslot, the downlink timeslot, and the uplink timeslot in terms of time is a multiplexing symbol, and one multiplexing symbol may be further divided into multiple subunits in a transform domain. For example, in an OFDMA system, the multiplexing symbol is an OFDM symbol, the transform domain may be a frequency domain, the subunit may be a subcarrier, and one OFDM symbol includes multiple subcarriers in the frequency domain; and in a CDMA system, the multiplexing symbol is a spread spectrum symbol, the transform domain may be a code domain, the subunit may be a code channel, and one spread spectrum symbol includes code channels corresponding to multiple channel codes in the code domain.

The user equipment provided in this embodiment can flexibly receive a downlink signal, or send an uplink signal, or receive a downlink signal and send an uplink signal simultaneously in a full-duplex timeslot on at least one carrier; and perform signal reception and sending respectively by using a downlink timeslot and an uplink timeslot. Compared with an existing TDD technology in which only an uplink time period is used to send an uplink signal and only a downlink time period is used to receive a downlink signal, and an existing FDD technology in which an uplink carrier can be only used to send an uplink signal and a downlink carrier is only used to receive a downlink signal, the present invention can improve spectrum utilization in a wireless communications system.

In an implementation manner, the downlink communications unit 32 is specifically configured to receive a synchronization channel signal and a broadcast channel signal in the downlink timeslot.

In a wireless cellular system, when accessing a network, the UE first achieves frequency and time synchronization by using a synchronization channel; performs cell searching by receiving a synchronization channel signal, to select a proper cell; further receives a broadcast channel signal of the selected cell after cell selection, to obtain information such as a wireless air interface configuration and a wireless resource of the cell; and then initiates random access (also referred to as non-synchronous random access) by using a random access channel (RACH for short) to access the network. After that, a base station of the cell keeps synchronized with the UE. When accessing the network, the UE needs to receive the synchronization channel signal and the broadcast channel signal; and before the UE is synchronized with the base station, the base station does not know existence of the UE, and therefore the base station may schedule UE near the UE for uplink transmission. To avoid uplink transmission interference from other UE to the UE that performs cell searching, the synchronization channel, a broadcast channel, and the like are arranged in the downlink timeslot. In this case, no UE performs uplink transmission in the entire cell. Therefore, no interference is caused to reception of the synchronization and broadcast channels by the UE.

In an implementation manner, the downlink communications unit 32 is configured to: when a service volume of to-be-transmitted downlink data does not exceed a first downlink service volume threshold, receive the to-be-transmitted downlink data by using the downlink timeslot.

The uplink communications unit 33 is configured to: when a service volume of to-be-transmitted uplink data does not exceed a first uplink service volume threshold, send the to-be-transmitted uplink data by using the uplink timeslot.

Optionally, the full-duplex communications unit 31 is specifically configured to perform one or more of the following operations:

when the service volume of the to-be-transmitted downlink data is greater than the first downlink service volume threshold, and the service volume of the to-be-transmitted uplink data is less than a second uplink service volume threshold, receiving, by using at least one first full-duplex timeslot, the to-be-transmitted downlink data sent by the wireless access device, where the first full-duplex timeslot is only used to receive a downlink signal; or when the service volume of the to-be-transmitted uplink data is greater than the first uplink service volume threshold, and the service volume of the to-be-transmitted downlink data is less than a second downlink service volume threshold, sending the to-be-transmitted uplink data to the wireless access device by using at least one second full-duplex timeslot, where the second full-duplex timeslot is only used to send an uplink signal.

In an implementation manner, referring to FIG. 13, the uplink communications unit 33 is specifically configured to send a random access signal in the uplink timeslot.

Figure 14:
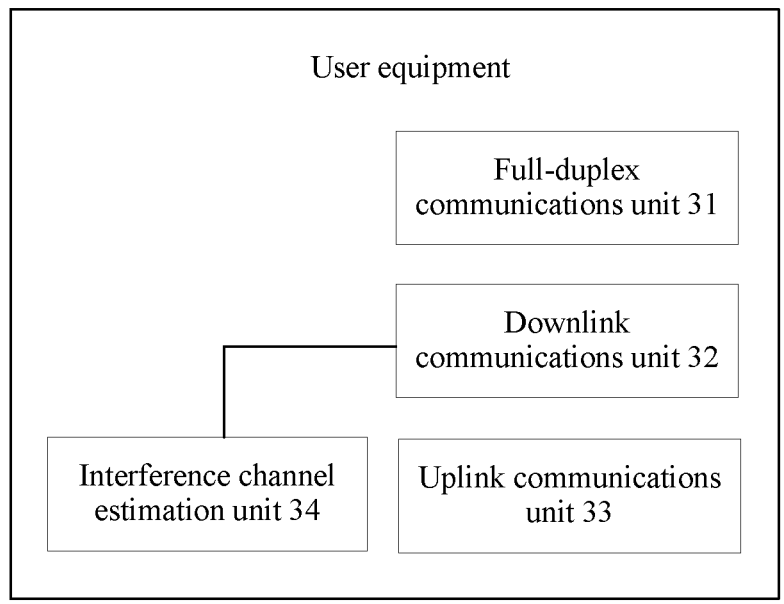
FIG. 14 is a schematic structural diagram of user equipment according to another embodiment of the present invention.

In an implementation manner, as shown in FIG. 14, the user equipment further includes: an interference channel estimation unit 34, configured to obtain an estimation of a self-interference channel matrix of the user equipment by using the uplink signal sent in the uplink timeslot.

Figure 15:
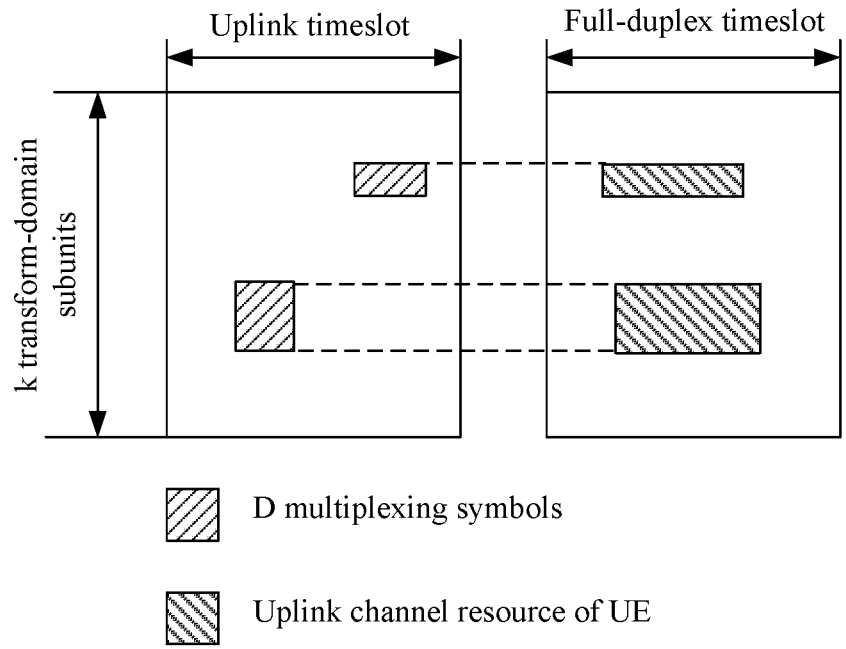
FIG. 15 is a schematic diagram of resource configuration of a full-duplex timeslot and an uplink timeslot according to an embodiment of the present invention.

Specifically, if the user equipment supports a full-duplex operation, the user equipment may estimate the self-interference channel by using the uplink timeslot. Because the base station does not perform downlink transmission in the uplink timeslot, downlink transmission of the base station does not cause interference to self-interference channel estimation by the UE. First, a proper frame length is designed, so that a self-interference channel of UE that moves at a medium or low rate is unchanged at least in a time of one radio frame. In this way, if the base station schedules full-duplex UE whose quantity of transmit antennas is D for full-duplex transmission, a corresponding uplink channel resource is also allocated to the UE in the uplink timeslot when uplink and downlink channel resources are allocated to the UE in the full-duplex timeslot. A location and a size of the uplink channel resource in the uplink timeslot in the transform domain are the same as those of the uplink channel resource allocated to the UE in the full-duplex timeslot, and the uplink timeslot includes at least D multiplexing symbols in terms of time, as shown in FIG. 15. In addition, to avoid interference from uplink transmission of other UE to self-interference channel estimation by the full-duplex UE, the base station no longer allocates all or some of uplink channel resources allocated to the UE to other UE for use that is spaced apart from the UE by a specific range. In addition, the uplink timeslot is affected by system self-interference to a relatively small extent. Preferably, the UE may transmit relatively important information such as an uplink sounding reference signal and uplink signaling by using the uplink channel resources.

In this way, when the UE transmits a signal on the uplink channel resource, the UE also performs a reception operation, and obtains an estimation of a self-interference channel on a transform-domain subunit corresponding to the downlink channel resource allocated to the UE in the full-duplex timeslot.

In this case, the uplink timeslot includes at least D multiplexing symbols, and each of the multiplexing symbols includes K transform-domain subunits. The user equipment has P transmit antennas and Q receive antennas. The interference channel estimation unit 34 is specifically configured to: obtain an uplink signal vector $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_P(d)$ is a signal transmitted by the $p^{th}$ transmit antenna of the user equipment;

obtain, according to the uplink signal vector, a self-interference signal $y_{h_q}(d)=x^T(d)h_n$ that is received by the user equipment on the $q^{th}$ receive antenna, where $q=0, 1, \ldots, Q-1$, $Q$ is a quantity of receive antennas of the user equipment, $h_q=[h_{q,0}, h_{q,1}, \ldots, h_{q,P-1}]^T$, and $h_{q,P}$ ($q=0, 1, \ldots, Q-1$, $p=0, 1, \ldots, P-1$) is an element in the $q^{th}$ row and the $p^{th}$ column of the to-be-estimated Q×P-dimensional self-interference channel matrix of the user equipment;

obtain, according to the self-interference signal on the D multiplexing symbols that is received by the CO receive antenna, linear equations $y_q=X^T h_q$ corresponding to the $q^{th}$ receive antenna, where $q=0, 1, \ldots, Q-1$, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtain the estimation of the self-interference channel of the user equipment according to the linear equations $y_q=X^T h_q$, for example, by solving the linear equations $y_q=X^T h_q$ corresponding to the $q^{th}$ receive antenna. The transform domain is a frequency domain, and the multiplexing symbol is an orthogonal frequency division multiplexing OFDM symbol.

Optionally, as shown in FIG. 13 and FIG. 7, the full-duplex communications unit 31 is specifically configured to: receive, by using at least one first multiplexing symbol in the full-duplex timeslot, a first control signal sent by the wireless access device, where the first control signal includes downlink common control signaling and a downlink common reference symbol, and the first multiplexing symbol is only used to receive a downlink signal; and send a second control signal to the wireless access device by using at least one second multiplexing symbol in the full-duplex timeslot, where the second control signal includes an uplink common reference symbol, the second multiplexing symbol is only used to send an uplink signal, and the multiplexing symbol may be an orthogonal frequency division multiplexing OFDM symbol.

Figure 16:
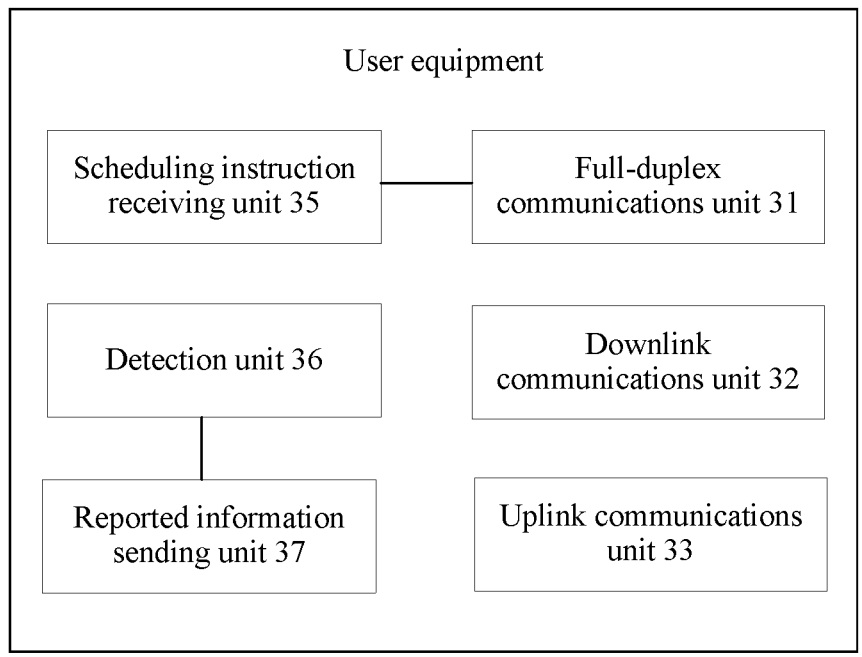
FIG. 16 is a schematic structural diagram of user equipment according to still another embodiment of the present invention.

In a specific implementation manner, as shown in FIG. 16, the user equipment further includes: a scheduling instruction receiving unit 35, configured to receive a scheduling instruction sent by the wireless access device, where the scheduling instruction includes information about a first channel in the uplink timeslot, where the uplink communications unit 33 is further configured to send, according to the scheduling instruction received by the scheduling instruction receiving unit 35, a beacon signal on the first channel by using the uplink timeslot;

a detection unit 36, configured to: measure a beacon signal that is sent on the first channel by at least one other user equipment served by the wireless access device, and generate a neighboring user equipment list according to the measured beacon signal, where the neighboring user equipment list includes at least an identifier of the user equipment and an identifier of the at least one other user equipment served by the wireless access device; and a reported information sending unit 37, configured to report the neighboring user equipment list obtained by the detection unit 36 to the wireless access device.

Further, the detection unit 36 generates, according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

According to the user equipment provided in this embodiment of the present invention, downlink signal reception, or uplink signal sending, or simultaneous downlink signal reception and uplink signal sending can be flexibly performed in a full-duplex timeslot on at least one carrier; and signal reception and sending are performed respectively by using a downlink timeslot and an uplink timeslot. Compared with an existing TDD technology in which only an uplink time period is used to send uplink signal data and only a downlink time period is used to receive a downlink signal, and an existing FDD technology in which an uplink carrier can be only used to send an uplink signal and a downlink carrier is only used to receive a downlink signal, the present invention can improve spectrum utilization in a wireless communications system.

Figure 17:
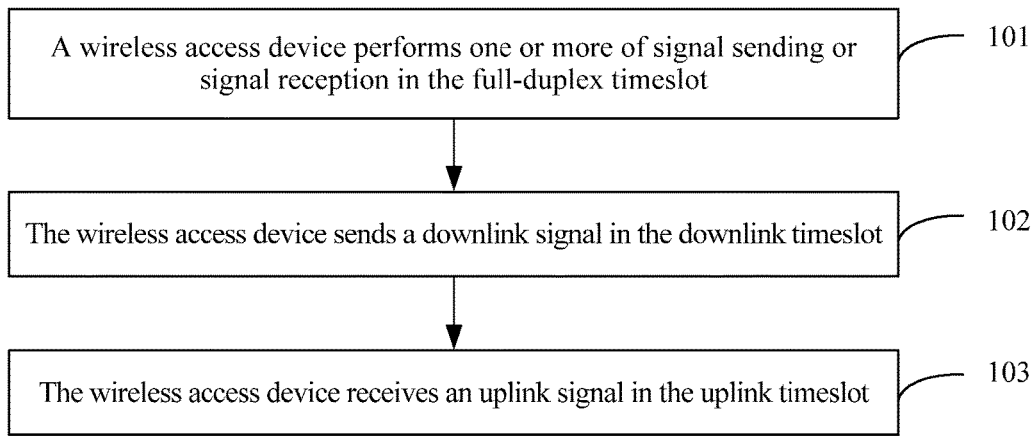
FIG. 17 is a schematic flowchart of a wireless communication method according to an embodiment of the present invention.

As shown in FIG. 17, an embodiment of the present invention provides a wireless communication method. A wireless access device communicates with user equipment on a first carrier by using at least three timeslots, and the at least three timeslots include at least one full-duplex timeslot, at least one downlink timeslot, and at least one uplink timeslot.

The wireless access device is specifically configured to execute the following method procedure:

101. The wireless access device performs one or more of signal sending or signal reception in the full-duplex timeslot.

102. The wireless access device sends a downlink signal in the downlink timeslot.

103. The wireless access device receives an uplink signal in the uplink timeslot.

A time sequence of the foregoing steps 101, 102, and 103 is not limited.

As shown in FIG. 3, the first carrier provided in this embodiment of the present invention successively includes a full-duplex timeslot used for a DL/UL, a downlink timeslot used for the DL, and an uplink timeslot used for the UL. Optionally, a guard period GP of a specific length is set between the downlink timeslot and the uplink timeslot.

According to the wireless communication method provided in this embodiment, a wireless access device can flexibly send a downlink signal, or receive an uplink signal, or send a downlink signal and receive an uplink signal simultaneously in a full-duplex timeslot on at least one carrier; and perform signal sending and reception respectively by using a downlink timeslot and an uplink timeslot. Compared with an existing TDD technology in which only an uplink time period is used to receive an uplink signal and only a downlink time period is used to send a downlink signal, and an existing FDD technology in which an uplink carrier can be only used to receive an uplink signal and a downlink carrier is only used to send a downlink signal, the present invention can improve spectrum utilization in a wireless communications system.

In an optional implementation manner, in step 102, the sending, by the wireless access device, a downlink signal in the downlink timeslot includes:

when a service volume of to-be-transmitted downlink data does not exceed a first downlink service volume threshold, sending, by the wireless access device, the to-be-transmitted downlink data by using the downlink timeslot.

In step 103, the receiving, by the wireless access device, an uplink signal in the uplink timeslot includes:

when a service volume of to-be-transmitted uplink data does not exceed a first uplink service volume threshold, receiving, by the wireless access device, the to-be-transmitted uplink data by using the uplink timeslot.

In an optional implementation manner, in step 101, the performing, by the wireless access device, one or more of signal sending or signal reception in the full-duplex timeslot includes one or more of the following:

when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot, where the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot, the to-be-transmitted uplink data sent by the user equipment, where the second full-duplex timeslot is only used to receive an uplink signal.

In the foregoing implementation manner, the wireless access device can schedule transmission in a half-duplex manner preferentially, thereby avoiding, to the greatest extent, interference occurring when signal sending and signal reception are simultaneously performed in the full-duplex timeslot.

In an optional implementation manner, the wireless access device is further configured to perform the following step:

obtaining, by the wireless access device, an estimation of a self-interference channel matrix of the wireless access device by using the downlink signal sent in the downlink timeslot.

Specifically, the downlink timeslot includes L multiplexing symbols in a time domain, and each of the multiplexing symbols includes K transform-domain subunits in a transform domain; and the obtaining, by the wireless access device, an estimation of a self-interference channel matrix of the wireless access device by using the downlink signal sent in the downlink timeslot includes:

obtaining a downlink signal vector $x(k)=[x_0(k), x_1(k), \ldots, x_{M-1}(k)]^T$ of transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtaining, according to the downlink signal vector, a self-interference that $y_n(k)=x^T(k)h_n$ is received by the wireless access device on the $n^{th}$ receive antenna, where $n=0, 1, \ldots, N-1$, N is a quantity of receive antennas of the wireless access device, $h_n=[h_{n,0}, h_{n,1}, \ldots, h_{n,M-1}]^T$, and $h_{n,m}$ ($n=0, 1, \ldots, N-1, m=0, 1, \ldots, M-1$) is an element in the $n^{th}$ row and the $m^{th}$ column of the to-be-estimated N×M-dimensional self-interference channel matrix of the wireless access device;

obtaining, according to the self-interference signal on the L multiplexing symbols that is received by the $n^{th}$ receive antenna, linear equations $y_n=X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtaining the estimation of the self-interference channel matrix of the wireless access device according to the linear equations $y_n=X^T h_n$.

The wireless access device needs to estimate the self-interference channel to support full-duplex transmission, which requires that only the wireless access device is allowed to perform downlink transmission and that the UE cannot perform uplink transmission when the wireless access device estimates the self-interference channel; otherwise, self-interference channel estimation by the wireless access device is interfered. Therefore, the wireless access device estimates the self-interference channel in the downlink timeslot. Because the wireless access device is usually static, the self-interference channel of the wireless access device may be assumed to be almost unchanged at least in a time of one radio frame.

In an optional implementation manner, in step 101, the performing, by the wireless access device, one or more of signal sending or signal reception in the full-duplex timeslot includes one or more of the following:

sending, by the wireless access device, a downlink signal to first user equipment on a first channel resource in the full-duplex timeslot; or receiving, by the wireless access device on a second channel resource in the full-duplex timeslot, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain, where the transform domain may be a frequency domain.

In an optional implementation manner, in step 101, the performing, by the wireless access device, signal sending in the full-duplex timeslot includes:

sending, by the wireless access device, a first control signal to the user equipment by using at least one first multiplexing symbol in the full-duplex timeslot, where the first control signal includes downlink common control signaling and a downlink common reference symbol, and the first multiplexing symbol is only used to send a signal.

In step 101, the performing, by the wireless access device, signal reception in the full-duplex timeslot includes:

receiving, by the wireless access device by using at least one second multiplexing symbol in the full-duplex timeslot, a second control signal sent by the user equipment, where the second control signal includes an uplink common reference symbol, and the second multiplexing symbol is only used to receive a signal.

The control signals are more important than user data. Therefore, in the full-duplex timeslot, multiplexing symbols for transmitting important control signal information are no longer allocated to an opposite transmission direction, so that impact of system self-interference on transmission of the important information is reduced.

In an optional implementation manner, the wireless access device is further configured to perform the following steps:

obtaining, by the wireless access device, a receive power of the uplink signal sent to the user equipment;

obtaining, by the wireless access device, an estimation of an uplink interference and noise floor of full-duplex communication; and when a ratio of the receive power to the estimation of the uplink interference and noise floor of full-duplex communication is less than a second threshold, receiving, by the wireless access device, the uplink signal that is sent by the user equipment in the uplink timeslot.

When the ratio of the receive power of the uplink signal of the UE to the estimation of the uplink interference and noise floor of full-duplex communication is less than the second threshold, it may be understood herein that the power of the received signal is relatively low, and the received signal is affected to a relatively great extent by the uplink interference and noise floor during full-duplex timeslot signal transmission. In this case, an uplink channel resource in the uplink timeslot is preferentially allocated to the UE for uplink transmission, to avoid a signal reception failure caused by interference.

In an optional implementation manner, in step 103, the receiving, by the wireless access device, an uplink signal in the uplink timeslot specifically includes:

receiving, by the wireless access device in the uplink timeslot, a random access signal sent by the user equipment.

In an optional implementation manner, the wireless access device is further configured to perform the following step:

sending, by the wireless access device, a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot; and receive, by the wireless access device, a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

Specifically, the neighboring user equipment list further includes a path loss between the at least one user equipment served by the wireless access device and the at least one other user equipment served by the wireless access device.

In an optional implementation manner, a radio frame used by the wireless access device includes sub-frames #0 to #9, where the downlink timeslot includes a downlink pilot timeslot in the sub-frame #1, and the uplink timeslot includes an uplink pilot timeslot in the sub-frame #1; and optionally, a first guard period is set between the downlink pilot timeslot in the sub-frame #1 and the uplink pilot timeslot in the sub-frame #1.

In an optional implementation manner, a radio frame used by the wireless access device includes sub-frames #0 to #9, where the downlink timeslot includes a downlink pilot timeslot in the sub-frame #6, and the uplink timeslot includes an uplink pilot timeslot in the sub-frame #6; and optionally, a second guard period is set between the downlink pilot timeslot in the sub-frame #6 and the uplink pilot timeslot in the sub-frame #6.

For a specific frame structure, reference may be made to the embodiments corresponding to FIG. 9, FIG. 10, FIG. 11, and FIG. 12, and details are not described herein.

Figure 18:
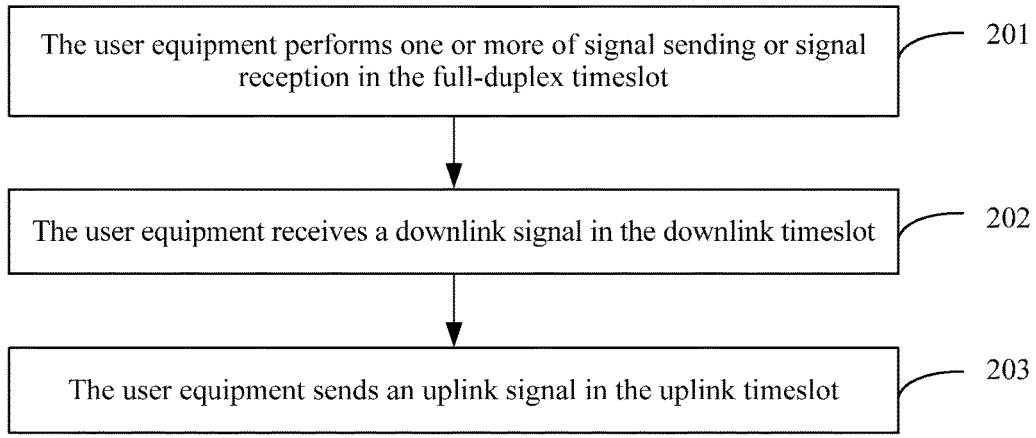
FIG. 18 is a schematic flowchart of a wireless communication method according to another embodiment of the present invention.

As shown in FIG. 18, an embodiment of the present invention provides a wireless communication method. User equipment communicates with a wireless access device on a first carrier by using at least three timeslots, and the at least three timeslots include at least one full-duplex timeslot, at least one downlink timeslot, and at least one uplink timeslot.

The user equipment is configured to perform the following steps:

201. The user equipment performs one or more of signal sending or signal reception in the full-duplex timeslot.

202. The user equipment receives a downlink signal in the downlink timeslot.

203. The user equipment sends an uplink signal in the uplink timeslot.

A time sequence of the foregoing steps 201, 202, and 203 is not limited.

As shown in FIG. 3, the first carrier provided in this embodiment of the present invention successively includes a full-duplex timeslot used for a DL/UL, a downlink timeslot used for the DL, and an uplink timeslot used for the UL. A guard period GP of a specific length is set between the downlink timeslot and the uplink timeslot.

According to the wireless communication method provided in this embodiment, user equipment can flexibly receive a downlink signal, or send an uplink signal, or receive a downlink signal and send an uplink signal simultaneously in a full-duplex timeslot on at least one carrier; and perform signal reception and sending respectively by using a downlink timeslot and an uplink timeslot. Compared with an existing TDD technology in which only an uplink time period is used to send an uplink signal and only a downlink time period is used to receive a downlink signal, and an existing FDD technology in which an uplink carrier can be only used to send an uplink signal and a downlink carrier is only used to receive a downlink signal, the present invention can improve spectrum utilization in a wireless communications system.

In an optional implementation manner, in step 202, the receiving, by the user equipment, a downlink signal in the downlink timeslot includes: when a service volume of to-be-transmitted downlink data does not exceed a first downlink service volume threshold, receiving, by the user equipment, the to-be-transmitted downlink data by using the downlink timeslot.

In step 203, the sending, by the user equipment, an uplink signal in the uplink timeslot includes: when a service volume of to-be-transmitted uplink data does not exceed a first uplink service volume threshold, sending, by the user equipment, the to-be-transmitted uplink data by using the uplink timeslot.

In an optional implementation manner, in step 201, the performing, by the user equipment, one or more of signal sending or signal reception in the full-duplex timeslot includes one or more of the following:

when the service volume of the to-be-transmitted downlink data is greater than the first downlink service volume threshold, and the service volume of the to-be-transmitted uplink data is less than a second uplink service volume threshold, receiving, by using at least one first full-duplex timeslot, the to-be-transmitted downlink data sent by the wireless access device, where the first full-duplex timeslot is only used to receive a downlink signal; or when the service volume of the to-be-transmitted uplink data is greater than the first uplink service volume threshold, and the service volume of the to-be-transmitted downlink data is less than a second downlink service volume threshold, sending, by the user equipment, the to-be-transmitted uplink data to the wireless access device by using at least one second full-duplex timeslot, where the second full-duplex timeslot is only used to send an uplink signal.

In the foregoing implementation manner, the user equipment can transmit data in a half-duplex manner preferentially, thereby avoiding, to the greatest extent, interference occurring when signal sending and signal reception are simultaneously performed in the full-duplex timeslot.

In an optional implementation manner, in step 203, the sending, by the user equipment, an uplink signal in the uplink timeslot specifically includes: sending, by the user equipment, a random access signal in the uplink timeslot.

In an optional implementation manner, the user equipment obtains an estimation of a self-interference channel matrix of the user equipment by using the uplink signal sent in the uplink timeslot.

Specifically, the uplink timeslot includes at least D multiplexing symbols, and each of the multiplexing symbols includes K transform-domain subunits; and the obtaining, by the user equipment, an estimation of a self-interference channel of the user equipment by using the uplink signal sent in the uplink timeslot includes:

obtaining an uplink signal vector $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_P(d)$ is a signal transmitted by the $p^{th}$ transmit antenna of the user equipment;

obtaining, according to the uplink signal vector, a self-interference signal $y_q(d)=x^T(d)h_q$ that is received by the user equipment on the $q^{th}$ receive antenna, where $q=0, 1, \ldots, Q-1$, Q is a quantity of receive antennas of the user equipment, $h_q=[h_{q,0}, h_{q,1}, \ldots, h_{q,P-1}]^T$, and $h_{q,P}$ ($q=0, 1, \ldots, Q-1, p=0, 1, \ldots, P-1$) is an element in the $q^{th}$ row and the $p^{th}$ column of the to-be-estimated Q×P-dimensional self-interference channel matrix of the user equipment;

obtaining, according to the self-interference signal on the D multiplexing symbols that is received by the CO receive antenna, linear equations $y_q=X^T h_q$ corresponding to the CO receive antenna, where $q=0, 1, \ldots, Q-1$, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtaining the estimation of the self-interference channel of the user equipment according to the linear equations $y_q=X^T h_q$.

If the user equipment supports a full-duplex operation, the user equipment may estimate the self-interference channel by using the uplink timeslot. Because the wireless access device does not perform downlink transmission in the uplink timeslot, downlink transmission of the wireless access device does not cause interference to self-interference channel estimation by the UE.

In an optional implementation manner, in step 201, the performing, by the user equipment, signal reception in the full-duplex timeslot includes: receiving, by the user equipment by using at least one first multiplexing symbol in the full-duplex timeslot, a first control signal sent by the wireless access device, where the first control signal includes downlink common control signaling and a downlink common reference symbol, and the first multiplexing symbol is only used to receive a downlink signal.

In step 201, the performing, by the user equipment, signal sending in the full-duplex timeslot includes: sending, by the user equipment, a second control signal to the wireless access device by using at least one second multiplexing symbol in the full-duplex timeslot, where the second control signal includes an uplink common reference symbol, and the second multiplexing symbol is only used to send an uplink signal.

The control signals are more important than user data. Therefore, in the full-duplex timeslot, multiplexing symbols for transmitting important control signal information are no longer allocated to an opposite transmission direction, so that impact of system self-interference on transmission of the important information is reduced.

In an optional implementation manner, the method further includes:

receiving, by the user equipment, a scheduling instruction sent by the wireless access device, where the scheduling instruction includes information about a first channel in the uplink timeslot;

sending, by the user equipment according to the scheduling instruction, a beacon signal on the first channel by using the uplink timeslot;

measuring, by the user equipment, a beacon signal that is sent on the first channel by at least one other user equipment served by the wireless access device, and generating a neighboring user equipment list according to the measured beacon signal, where the neighboring user equipment list includes at least an identifier of the user equipment and an identifier of the at least one other user equipment served by the wireless access device; and reporting the neighboring user equipment list to the wireless access device.

Further, the user equipment generates, according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

Figure 19:
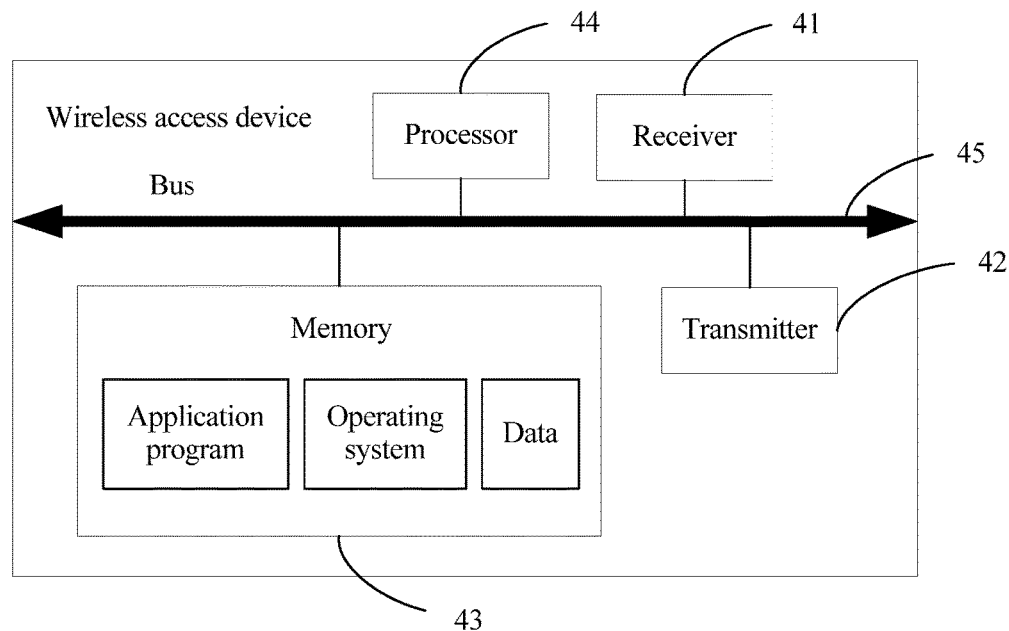
FIG. 19 is a schematic structural diagram of a wireless access device according to still yet another embodiment of the present invention.

As shown in FIG. 19, an embodiment of the present invention provides a wireless access device. The wireless access device communicates with user equipment on a first carrier by using at least three timeslots, and the at least three timeslots include at least one full-duplex timeslot, at least one downlink timeslot, and at least one uplink timeslot. The wireless access device includes: a receiver 41, a transmitter 42, a memory 43, a processor 44, and a bus 45, where the receiver 41, the transmitter 42, the memory 43, and the processor 44 are connected by using the bus 45, to implement mutual communication, and the memory 43 is configured to store data processed by the processor 45.

The bus 45 may be an industry standard architecture (ISA for short) bus, a peripheral component interconnect (PCI for short) bus, an extended industry standard architecture (EISA for short) bus, or the like, which is not limited herein. The bus 45 may be classified into an address bus, a data bus, a control bus, and the like. For ease of denotation, the bus 45 is represented by only one bold line in FIG. 19, which, however, does not indicate that there is only one bus or one type of bus.

The memory 43 is configured to store data or executable program code, where the program code includes a computer operation instruction, and may be specifically an operating system, an application program, and the like. The memory 43 may include a high-speed RAM memory, and may further include a non-volatile memory, such as at least one magnetic disk memory.

The processor 44 may be a central processing unit CPU for short) or an application-specific integrated circuit (ASIC for short), or may be configured to be one or more integrated circuits for implementing the embodiments of the present invention.

The processor 44 is configured to execute the program code in the memory 42 to perform, by using the receiver 41 and the transmitter 42, signal exchange with the user equipment served by the wireless access device, so as to implement the wireless communication method executed by the units in the foregoing embodiments. Details are as follows.

The processor 44 is configured to perform one or more of the following operations in the full-duplex timeslot, including: performing signal sending by using the transmitter 42 or performing signal reception by using the receiver 41;

the processor 44 is configured to send a downlink signal in the downlink timeslot by using the transmitter 42; and the processor 44 is configured to receive an uplink signal in the uplink timeslot by using the receiver 41.

In an optional implementation manner, the processor 44 is specifically configured to: when a service volume of to-be-transmitted downlink data does not exceed a first downlink service volume threshold, send the to-be-transmitted downlink data by using the downlink timeslot and by using the transmitter 42.

In an optional implementation manner, the processor 44 is specifically configured to: when a service volume of to-be-transmitted uplink data does not exceed a first uplink service volume threshold, receive the to-be-transmitted uplink data by using the uplink timeslot and by using the receiver 41.

In an optional implementation manner, the processor 44 is specifically configured to perform one or more of the following operations: when the service volume of the to-be-transmitted downlink data is greater than the first downlink service volume threshold, and the service volume of the to-be-transmitted uplink data is less than a second uplink service volume threshold, sending the to-be-transmitted downlink data to the user equipment by using at least one first full-duplex timeslot and by using the transmitter 42, where the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot and by using the receiver 41, the to-be-transmitted uplink data sent by the user equipment, where the second full-duplex timeslot is only used to receive an uplink signal.

In an optional implementation manner, the processor 44 is further configured to obtain an estimation of a self-interference channel matrix of the wireless access device by using the downlink signal sent in the downlink timeslot.

In an optional implementation manner, the downlink timeslot includes L multiplexing symbols in a time domain, and each of the multiplexing symbols includes K transform-domain subunits in a transform domain; and the processor 44 is specifically configured to: obtain a downlink signal vector $x(k)=[x_0(k), x_1(k), \ldots, x_{M-1}(k)]^T$ of transform-domain subunits on the $k^{th}$ multiplexing symbol, where M is a quantity of transmit antennas of the wireless access device, and $x_m(k)$ is a downlink signal transmitted by the $m^{th}$ transmit antenna of the wireless access device;

obtain, according to the downlink signal vector, a self-interference signal $y_n(k)=x^T(k)h_n$ that is received by the wireless access device on the $n^{th}$ receive antenna, where $n=0, 1, \ldots, N-1$, N is a quantity of receive antennas of the wireless access device, $h_n=[h_{n,0}, h_{n,1}, \ldots, h_{n,M-1}]^T$, and $h_{n,m}$ ($n=0, 1, \ldots, N-1$, $m=0, 1, \ldots, M-1$) is an element in the $n^{th}$ row and the $m^{th}$ column of the to-be-estimated N×M-dimensional self-interference channel matrix of the wireless access device;

obtain, according to the self-interference signal on the L multiplexing symbols that is received by the $n^{th}$ receive antenna, linear equations $y_n=X^T h_n$ corresponding to the $n^{th}$ receive antenna, where $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtain the estimation of the self-interference channel matrix of the wireless access device according to the linear equations $y_n=X^T h_n$.

In an optional implementation manner, the processor 44 is specifically configured to perform one or more of the following operations:

sending a downlink signal to first user equipment on a first channel resource in the full-duplex timeslot by using the transmitter 42; or receiving, on a second channel resource in the full-duplex timeslot by using the receiver 41, an uplink signal sent by second user equipment, where when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain, where the transform domain may be a frequency domain.

In an optional implementation manner, the processor 44 is specifically configured to send a first control signal to the user equipment by using at least one first multiplexing symbol in the full-duplex timeslot and by using the transmitter 42, where the first control signal includes downlink common control signaling and a downlink common reference symbol, and the first multiplexing symbol is only used to send a signal.

In an optional implementation manner, the processor 44 is specifically configured to receive, by using at least one second multiplexing symbol in the full-duplex timeslot and by using the receiver 41, a second control signal sent by the user equipment, where the second control signal includes an uplink common reference symbol, and the second multiplexing symbol is only used to receive a signal.

In an optional implementation manner, the processor 44 is further configured to obtain a receive power of the uplink signal sent to the user equipment.

The processor 44 is further configured to obtain an estimation of an uplink interference and noise floor of full-duplex communication.

The processor 44 is further configured to: when a ratio of the receive power to the estimation of the uplink interference and noise floor of full-duplex communication is less than a second threshold, receive, by using the receiver 41, the uplink signal that is sent by the user equipment in the uplink timeslot.

In an optional implementation manner, the processor 44 is specifically configured to receive, in the uplink timeslot by using the receiver 41, a random access signal sent by the user equipment.

In an optional implementation manner, the processor 44 is configured to send, by using the transmitter 42, a scheduling instruction to at least one user equipment served by the wireless access device, where the scheduling instruction includes information about a first channel in the uplink timeslot, so that the at least one user equipment served by the wireless access device sends, according to the scheduling instruction, a beacon signal on the first channel by using the uplink timeslot.

The processor 44 is further configured to receive, by using the receiver 41, a neighboring user equipment list reported by the at least one user equipment served by the wireless access device, where the neighboring user equipment list is obtained by the at least one user equipment, which is served by the wireless access device, according to a measured beacon signal that is sent by at least one other user equipment served by the wireless access device, and the neighboring user equipment list includes at least an identifier of the at least one user equipment served by the wireless access device and an identifier of the at least one other user equipment served by the wireless access device.

In an optional implementation manner, the neighboring user equipment list further includes a path loss between the at least one user equipment served by the wireless access device and the at least one other user equipment served by the wireless access device.

In an optional implementation manner, a radio frame used by the wireless access device includes sub-frames #0 to #9, where
the downlink timeslot includes a downlink pilot timeslot in the sub-frame #1, and the uplink timeslot includes an uplink pilot timeslot in the sub-frame #1.

In an optional implementation manner, a radio frame used by the wireless access device includes sub-frames #0 to #9, where the downlink timeslot includes a downlink pilot timeslot in the sub-frame #6, and the uplink timeslot includes an uplink pilot timeslot in the sub-frame #6.

The processor 44 is configured to execute the program code in the memory 42 to perform, by using the receiver 41 and the transmitter 42, signal exchange with the user equipment served by the wireless access device, so as to implement the wireless communication method executed by the units in the foregoing embodiments. Therefore, for specific operations performed by the components, refer to descriptions of the corresponding units. Details are not described herein.

The wireless access device provided in this embodiment can flexibly send a downlink signal, or receive an uplink signal, or send a downlink signal and receive an uplink signal simultaneously in a full-duplex timeslot on at least one carrier; and perform signal sending and reception respectively by using a downlink timeslot and an uplink timeslot. Compared with an existing TDD technology in which only an uplink time period is used to receive an uplink signal and only a downlink time period is used to send a downlink signal, and an existing FDD technology in which an uplink carrier can be only used to receive an uplink signal and a downlink carrier is only used to send a downlink signal, the present invention can improve spectrum utilization in a wireless communications system.

Figure 20:
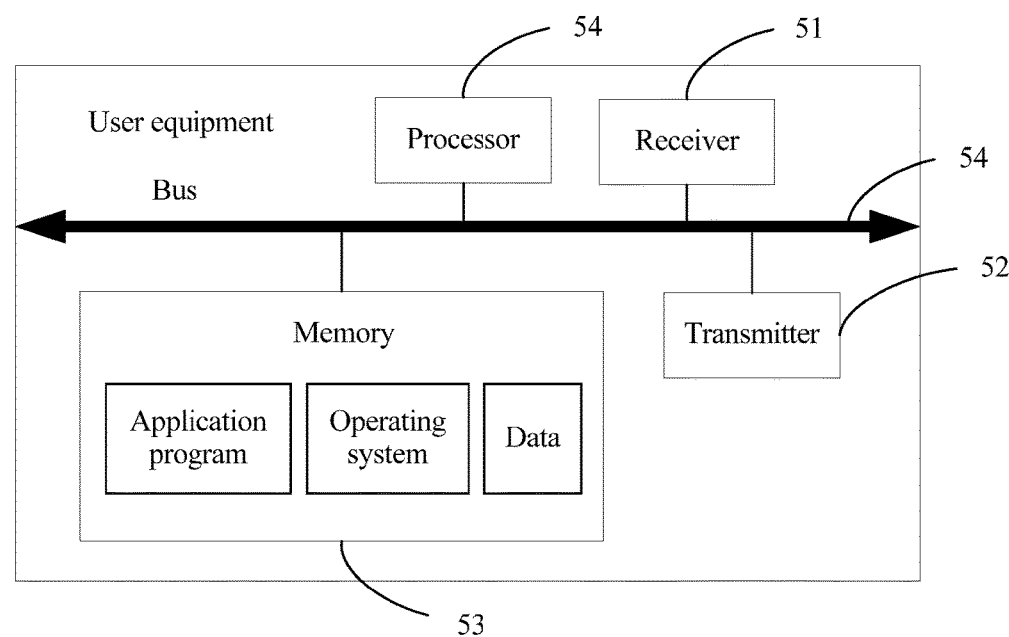
FIG. 20 is a schematic structural diagram of user equipment according to yet another embodiment of the present invention.

As shown in FIG. 20, an embodiment of the present invention provides user equipment. The user equipment communicates with a wireless access device on a first carrier by using at least three timeslots, and the at least three timeslots include at least one full-duplex timeslot, at least one downlink timeslot, and at least one uplink timeslot. The user equipment includes: a receiver 51, a transmitter 52, a memory 53, a processor 54, and a bus 55, where the receiver 51, the transmitter 52, the memory 53, and the processor 54 are connected by using the bus 55, to implement mutual communication, and the memory 53 is configured to store data processed by the processor 54.

The bus 55 may be an industry standard architecture (ISA for short) bus, a peripheral component interconnect (PCI for short) bus, an extended industry standard architecture (EISA for short) bus, or the like, which is not limited herein. The bus 55 may be classified into an address bus, a data bus, a control bus, and the like. For ease of denotation, the bus 55 is represented by only one bold line in FIG. 20, which, however, does not indicate that there is only one bus or one type of bus.

The memory 53 is configured to store data or executable program code, where the program code includes a computer operation instruction, and may be specifically an operating system, an application program, and the like. The memory 53 may include a high-speed RAM memory, and may further include a non-volatile memory, such as at least one magnetic disk memory.

The processor 54 may be a central processing unit CPU for short) or an application-specific integrated circuit ASIC for short), or may be configured to be one or more integrated circuits for implementing the embodiments of the present invention.

The processor 54 is configured to execute the program code in the memory 52 to perform signal exchange with the wireless access device by using the receiver 51 and the transmitter 52, so as to implement the wireless communication method executed by the units in the foregoing embodiments. Details are as follows.

The processor 54 is configured to perform one or more of the following operations in the full-duplex timeslot, including: performing signal sending by using the transmitter 52 or performing signal reception by using the receiver 51;
the processor 54 is configured to receive a downlink signal in the downlink timeslot by using the receiver 51; and
the processor 54 is configured to send an uplink signal in the uplink timeslot by using the transmitter 52.

In an optional implementation manner, the processor 54 is specifically configured to: when a service volume of to-be-transmitted downlink data does not exceed a first downlink service volume threshold, receive the to-be-transmitted downlink data by using the downlink timeslot and by using the receiver 51.

In an optional implementation manner, the processor 54 is specifically configured to: when a service volume of to-be-transmitted uplink data does not exceed a first uplink service volume threshold, send the to-be-transmitted uplink data by using the uplink timeslot and by using the transmitter 52.

In an optional implementation manner, the processor 54 is specifically configured to perform one or more of the following operations: when the service volume of the to-be-transmitted downlink data is greater than the first downlink service volume threshold, and the service volume of the to-be-transmitted uplink data is less than a second uplink service volume threshold, receiving, by using at least one first full-duplex timeslot and by using the receiver 51, the to-be-transmitted downlink data sent by the wireless access device, where the first full-duplex timeslot is only used to receive a downlink signal; or
when the service volume of the to-be-transmitted uplink data is greater than the first uplink service volume threshold, and the service volume of the to-be-transmitted downlink data is less than a second downlink service volume threshold, sending the to-be-transmitted uplink data to the wireless access device by using at least one second full-duplex timeslot and by using the transmitter 52, where the second full-duplex timeslot is only used to send an uplink signal.

In an optional implementation manner, the processor 54 is specifically configured to send a random access signal in the uplink timeslot by using the transmitter 52.

In an optional implementation manner, the processor 54 is further configured to obtain an estimation of a self-interference channel matrix of the user equipment by using the uplink signal sent in the uplink timeslot.

Further, the uplink timeslot includes at least D multiplexing symbols, and each of the multiplexing symbols includes K transform-domain subunits; and the processor 54 is specifically configured to: obtain an uplink signal vector $x(d)=[x_0(d), x_1(d), \ldots, x_{P-1}(d)]^T$ of transform-domain subunits on the $d^{th}$ multiplexing symbol, where P is a quantity of transmit antennas of the user equipment, and $x_P(d)$ is a signal transmitted by the $p^{th}$ transmit antenna of the user equipment;

obtain, according to the uplink signal vector, a self-interference signal $y_q(d)=x^T(d)h_q$ that is received by the user equipment on the $q^{th}$ receive antenna, where $q=0, 1, \ldots, Q-1$, Q is a quantity of receive antennas of the user equipment, $h_q=[h_{q,0}, h_{q,1}, \ldots, h_{q,P-1}]^T$, and $h_{q,P}$ ($q=0, 1, \ldots, Q-1$, $p=0, 1, \ldots, P-1$) is an element in the $q^{th}$ row and the $p^{th}$ column of the to-be-estimated Q×P-dimensional self-interference channel matrix of the user equipment;

obtain, according to the self-interference signal on the D multiplexing symbols that is received by the $q^{th}$ receive antenna, linear equations $y_q=X^T h_q$ corresponding to the $q^{th}$ receive antenna, where $q=0, 1, \ldots, Q-1$, $y_q=[y_q(0), y_q(1), \ldots, y_q(D-1)]^T$ is a self-interference signal vector received by the $q^{th}$ receive antenna, and $X=[x(0), x(1), \ldots, x(D-1)]$ is a P×D-dimensional transmitted signal matrix; and obtain the estimation of the self-interference channel of the user equipment according to the linear equations $y_q=X^T h_q$.

In an optional implementation manner, the processor 54 is specifically configured to receive, by using at least one first multiplexing symbol in the full-duplex timeslot and by using the receiver 51, a first control signal sent by the wireless access device, where the first control signal includes downlink common control signaling and a downlink common reference symbol, and the first multiplexing symbol is only used to receive a downlink signal.

In an optional implementation manner, the processor 54 is specifically configured to send a second control signal to the wireless access device by using at least one second multiplexing symbol in the full-duplex timeslot and by using the transmitter 52, where the second control signal includes an uplink common reference symbol, and the second multiplexing symbol is only used to send an uplink signal.

In an optional implementation manner, the processor 54 is further configured to receive, by using the receiver 51, a scheduling instruction sent by the wireless access device, where the scheduling instruction includes information about a first channel in the uplink timeslot.

The processor 54 is further specifically configured to send, according to the scheduling instruction received by the receiver 51, a beacon signal on the first channel by using the uplink timeslot and by using the transmitter 52.

The processor 54 is further configured to: measure a beacon signal that is sent on the first channel by at least one other user equipment served by the wireless access device, and generate a neighboring user equipment list according to the measured beacon signal, where the neighboring user equipment list includes at least an identifier of the user equipment and an identifier of the at least one other user equipment served by the wireless access device.

The processor 54 is further configured to report the obtained neighboring user equipment list to the wireless access device by using the transmitter 52.

Further, the processor 54 is further configured to generate, according to a receive power of the beacon signal, a path loss between at least one user equipment served by the wireless access device and the at least one other user equipment served by the wireless access device, where the neighboring user equipment list further includes the path loss between the at least one user equipment served by the wireless access device and the at least one other user equipment served by the wireless access device.

The processor 54 is configured to execute the program code in the memory 52 to perform signal exchange with the wireless access device by using the receiver 51 and the transmitter 52, so as to implement the wireless communication method executed by the units in the foregoing embodiments. Therefore, for specific operations performed by the components, refer to descriptions of the corresponding units. Details are not described herein.

The user equipment provided in this embodiment can flexibly receive a downlink signal, or send an uplink signal, or receive a downlink signal and send an uplink signal simultaneously in a full-duplex timeslot on at least one carrier; and perform signal reception and sending respectively by using a downlink timeslot and an uplink timeslot. Compared with an existing TDD technology in which only an uplink time period is used to send an uplink signal and only a downlink time period is used to receive a downlink signal, and an existing FDD technology in which an uplink carrier can be only used to send an uplink signal and a downlink carrier is only used to receive a downlink signal, the present invention can improve spectrum utilization in a wireless communications system.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method, wherein a wireless access device communicates with user equipment on a first carrier by using at least three timeslots, and the at least three timeslots comprise at least one full-duplex timeslot, at least one downlink timeslot, and at least one uplink timeslot; and the method comprises:

performing, by the wireless access device, one or more of signal sending or signal reception in the full-duplex timeslot;

sending, by the wireless access device, a downlink signal in the downlink timeslot; and receiving, by the wireless access device, an uplink signal in the uplink timeslot, wherein the performing, by the wireless access device, one or more of signal sending or signal reception in the full-duplex timeslot comprises one or more of the following:

when a service volume of the to-be-transmitted downlink data is greater than a first downlink service volume threshold, and a service volume of the to-be-transmitted uplink data is less than a second uplink service volume threshold, sending the to-be-transmitted downlink data to the user equipment by using at least one first full-duplex timeslot, wherein the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot, the to-be-transmitted uplink data sent by the user equipment, wherein the second full-duplex timeslot is only used to receive an uplink signal.

2. The method according to claim 1, wherein the sending, by the wireless access device, a downlink signal in the downlink timeslot comprises:

when a service volume of to-be-transmitted downlink data does not exceed a first downlink service volume threshold, sending, by the wireless access device, the to-be-transmitted downlink data by using the downlink timeslot.

3. The method according to claim 1, wherein the receiving, by the wireless access device, an uplink signal in the uplink timeslot comprises:

when a service volume of to-be-transmitted uplink data does not exceed a first uplink service volume threshold, receiving, by the wireless access device, the to-be-transmitted uplink data by using the uplink timeslot.

4. The method according to claim 1, wherein the method further comprises:

obtaining, by the wireless access device, an estimation of a self-interference channel matrix of the wireless access device by using the downlink signal sent in the downlink timeslot.

5. The method according to claim 4, wherein the downlink timeslot comprises L multiplexing symbols in a time domain, and each of the multiplexing symbols comprises K transform-domain subunits in a transform domain; and the obtaining, by the wireless access device, an estimation of a self-interference channel matrix of the wireless access device by using the downlink signal sent in the downlink timeslot comprises:

obtaining a downlink signal vector $x(k)=[x_0(k), x_1(k), \ldots, x_{M-1}(k)]^T$ of transform-domain subunits on the $k^{th}$ multiplexing symbol, wherein M is a quantity of transmit antennas of the wireless access device, and $x_m(k)$ is a downlink signal transmitted by the $m^{th}$ transmit antenna of the wireless access device;

obtaining, according to the downlink signal vector, a self-interference signal $y_n(k)=x^T(k)h_n$ that is received by the wireless access device on the $n^{th}$ receive antenna, wherein $n=0, 1, \ldots, N-1$, N is a quantity of receive antennas of the wireless access device, $h_n=[k_{n,0}, h_{n,1}, \ldots, h_{n,M-1}]^T$, and $h_{n,m}$ ($n=0, 1, \ldots, N-1$, $m=0, 1, \ldots, M-1$) is an element in the $n^{th}$ row and the $m^{th}$ column of the to-be-estimated N×M-dimensional self-interference channel matrix of the wireless access device;

obtaining, according to the self-interference signal on the L multiplexing symbols that is received by the $n^{th}$ receive antenna, linear equations $y_n=X^T h_n$ corresponding to the $n^{th}$ receive antenna, wherein $n=0, 1, \ldots, N-1$, $y_n=[y_n(0), y_n(1), \ldots, y_n(L-1)]^T$ is a self-interference signal vector received by the $n^{th}$ receive antenna, and $X=[x(0), x(1), \ldots, x(L-1)]$ is an M×L-dimensional transmitted signal matrix; and obtaining the estimation of the self-interference channel matrix of the wireless access device according to the linear equations $y_n=X^T h_n$.

6. The method according to claim 5, wherein the performing, by the wireless access device, one or more of signal sending or signal reception in the full-duplex timeslot comprises:

sending, by the wireless access device, a downlink signal to first user equipment on a first channel resource in the full-duplex timeslot; or receiving, by the wireless access device on a second channel resource in the full-duplex timeslot, an uplink signal sent by second user equipment, wherein when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain, wherein the transform domain is a frequency domain.

7. A wireless communication method, wherein user equipment communicates with a wireless access device on a first carrier by using at least three timeslots, and the at least three timeslots comprise at least one full-duplex timeslot, at least one downlink timeslot, and at least one uplink timeslot; and the method comprises:

performing, by the user equipment, one or more of signal sending or signal reception in the full-duplex timeslot;

receiving, by the user equipment, a downlink signal in the downlink timeslot; and sending, by the user equipment, an uplink signal in the uplink timeslot.

8. The method according to claim 7, wherein the receiving, by the user equipment, a downlink signal in the downlink timeslot comprises:

when a service volume of to-be-transmitted downlink data does not exceed a first downlink service volume threshold, receiving, by the user equipment, the to-be-transmitted downlink data by using the downlink timeslot.

9. The method according to claim 7, wherein the sending, by the user equipment, an uplink signal in the uplink timeslot comprises:

when a service volume of to-be-transmitted uplink data does not exceed a first uplink service volume threshold, sending, by the user equipment, the to-be-transmitted uplink data by using the uplink timeslot.

10. A wireless access device, wherein the wireless access device communicates with user equipment on a first carrier by using at least three timeslots, and the at least three timeslots comprise at least one full-duplex timeslot, at least one downlink timeslot, and at least one uplink timeslot; and the wireless access device comprises: a receiver, a transmitter, a memory, a processor, and a bus, wherein the receiver, the transmitter, the memory, and the processor are connected by using the bus, to implement mutual communication, and the memory is configured to store data processed by the processor, wherein the processor is configured to perform one or more of the following operations in the full-duplex timeslot, comprising: performing signal sending by using the transmitter or performing signal reception by using the receiver;

the processor is configured to send a downlink signal in the downlink timeslot by using the transmitter; and the processor is configured to receive an uplink signal in the uplink timeslot by using the receiver, wherein the processor is further configured to perform one or more of the following operations:

when a service volume of the to-be-transmitted downlink data is greater than a first downlink service volume threshold, and a service volume of the to-be-transmitted uplink data is less than a second uplink service volume threshold, sending the to-be-transmitted downlink data to the user equipment by using at least one first full-duplex timeslot and by using the transmitter, wherein the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot and by using the receiver, the to-be-transmitted uplink data sent by the user equipment, wherein the second full-duplex timeslot is only used to receive an uplink signal.

11. The device according to claim 10, wherein the processor is configured to: when a service volume of to-be-transmitted downlink data does not exceed a first downlink service volume threshold, send the to-be-transmitted downlink data by using the downlink timeslot and by using the transmitter.

12. The device according to claim 10, wherein the processor is configured to: when a service volume of to-be-transmitted uplink data does not exceed a first uplink service volume threshold, receive the to-be-transmitted uplink data by using the uplink timeslot and by using the receiver.

13. The device according to claim 10, wherein the processor is further configured to obtain an estimation of a self-interference channel matrix of the wireless access device by using the downlink signal sent in the downlink timeslot.

14. The device according to claim 13, wherein the downlink timeslot comprises L multiplexing symbols in a time domain, and each of the multiplexing symbols comprises K transform-domain subunits in a transform domain; and the processor is configured to: obtain a downlink signal vector $x(k)=[x_0(k), x_1(k), \ldots, x_{M-1}(k)]^T$ of transform-domain subunits on the $k^{th}$ multiplexing symbol, wherein M is a quantity of transmit antennas of the wireless access device, and $x_m(k)$ is a downlink signal transmitted by the $m^{th}$ transmit antenna of the wireless access device;

obtain, according to the downlink signal vector, a self-interference signal $y_n(k)=x^T(k)h_n$ that is received by the wireless access device on the $n^{th}$ receive antenna, wherein n=0, 1, . . . , N−1, N is a quantity of receive antennas of the wireless access device, $h_n=[k_{n,0}, h_{n,1}, \ldots, h_{n,M-1}]^T$, and $h_{n,m}$ (n=0, 1, . . . , N−1, m=0, 1, . . . , M−1) is an element in the $n^{th}$ row and the $m^{th}$ column of the to-be-estimated N×M-dimensional self-interference channel matrix of the wireless access device;

obtain, according to the self-interference signal on the L multiplexing symbols that is received by the $n^{th}$ receive antenna, linear equations $y_n=X^T h_n$ corresponding to the $n^{th}$ receive antenna, wherein n=0, 1, . . . , N−1, $y_n=[y_n(0), y_n(1), \ldots, y_n(L-1)]^T$ is a self-interference signal vector received by the $n^{th}$ receive antenna, and X=[x(0), x(1), . . . , x(L−1)] is an M×L-dimensional transmitted signal matrix; and obtain the estimation of the self-interference channel matrix of the wireless access device according to the linear equations $y_n=X^T h_n$.

15. The device according to claim 10, wherein the processor is configured to perform one or more of the following operations:

sending a downlink signal to first user equipment on a first channel resource in the full-duplex timeslot by using the transmitter; or receiving, on a second channel resource in the full-duplex timeslot by using the receiver, an uplink signal sent by second user equipment, wherein when a path loss between the first user equipment and the second user equipment is greater than or equal to a first threshold, the first channel resource and the second channel resource partially or completely overlap in terms of time domain, and the first channel resource and the second channel resource partially or completely overlap in the transform domain; or when a path loss between the first user equipment and the second user equipment is less than a first threshold, the first channel resource and the second channel resource do not overlap in the transform domain.

16. User equipment, wherein the user equipment communicates with a wireless access device on a first carrier by using at least three timeslots, and the at least three timeslots comprise at least one full-duplex timeslot, at least one downlink timeslot, and at least one uplink timeslot; and the user equipment comprises: a receiver, a transmitter, a memory, a processor, and a bus, wherein the receiver, the transmitter, the memory, and the processor are connected by using the bus, to implement mutual communication, and the memory is configured to store data processed by the processor, wherein the processor is configured to perform one or more of the following operations in the full-duplex timeslot, comprising: performing signal sending by using the transmitter or performing signal reception by using the receiver;

the processor is configured to receive a downlink signal in the downlink timeslot by using the receiver; and the processor is configured to send an uplink signal in the uplink timeslot by using the transmitter, wherein the processor is further configured to perform one or more of the following operations:

when a service volume of the to-be-transmitted downlink data is greater than a first downlink service volume threshold, and a service volume of the to-be-transmitted uplink data is less than a second uplink service volume threshold, sending the to-be-transmitted downlink data to the user equipment by using at least one first full-duplex timeslot and by using the transmitter, wherein the first full-duplex timeslot is only used to send a downlink signal; or when the service volume of the to-be-transmitted uplink data is greater than the first uplink service volume threshold, and the service volume of the to-be-transmitted downlink data is less than a second downlink service volume threshold, receiving, by using at least one second full-duplex timeslot and by using the receiver, the to-be-transmitted uplink data sent by the user equipment, wherein the second full-duplex timeslot is only used to receive an uplink signal.

17. The equipment according to claim 16, wherein the processor is configured to: when a service volume of to-be-transmitted downlink data does not exceed a first downlink service volume threshold, receive the to-be-transmitted downlink data by using the downlink timeslot and by using the receiver.

18. The equipment according to claim 16, wherein the processor is configured to: when a service volume of to-be-transmitted uplink data does not exceed a first uplink service volume threshold, send the to-be-transmitted uplink data by using the uplink timeslot and by using the transmitter.

* * * * *

UNITED STATES PATENT AND TRADEMARK OFFICE
CERTIFICATE OF CORRECTION

| | | |
|---|---|---|
| PATENT NO. | : 10,411,871 B2 | Page 1 of 1 |
| APPLICATION NO. | : 15/440668 | |
| DATED | : September 10, 2019 | |
| INVENTOR(S) | : Sheng Liu et al. | |

It is certified that error appears in the above-identified patent and that said Letters Patent is hereby corrected as shown below:

In the Claims

Column 50, Line 2 (approx.), In Claim 5, after "device," delete "$h_n=[k_{n,0}, h_{n,1}, \ldots, h_{n,M-1}]^T$," and insert -- $\mathbf{h}_n = [h_{n,0}, h_{n,1}, \cdots, h_{n,M-1}]^T$ --, therefor.

Column 52, Line 5 (approx.), In Claim 14, after "device," delete "$h_n=[k_{n,0}, h_{n,1}, \ldots, h_{n,M-1}]^T$," and insert -- $\mathbf{h}_n = [h_{n,0}, h_{n,1}, \cdots, h_{n,M-1}]^T$ --, therefor.

Signed and Sealed this
Twenty-fifth Day of February, 2020

Andrei Iancu
*Director of the United States Patent and Trademark Office*